(12) United States Patent
Pearson et al.

(10) Patent No.: US 9,769,313 B2
(45) Date of Patent: Sep. 19, 2017

(54) SYSTEMS AND METHODS FOR SCREENING COMMUNICATIONS BASED ON RECEIVER PROGRAMMABLE PINS

(75) Inventors: Gregory A. Pearson, Dunedin, FL (US); Ronald Shane Hamilton, St. Petersburg, FL (US); David B. Hall, New Port Richey, FL (US)

(73) Assignee: GREGORY A. PEARSON, INC., Dunedin, FL (US)

( * ) Notice: Subject to any disclaimer, the term of this patent is extended or adjusted under 35 U.S.C. 154(b) by 1033 days.

(21) Appl. No.: 13/285,080

(22) Filed: Oct. 31, 2011

(65) Prior Publication Data

US 2012/0045045 A1 Feb. 23, 2012

Related U.S. Application Data

(63) Continuation of application No. 12/237,316, filed on Sep. 24, 2008.
(Continued)

(51) Int. Cl.
*H04M 3/436* (2006.01)
*G06Q 10/06* (2012.01)
(Continued)

(52) U.S. Cl.
CPC .......... *H04M 3/436* (2013.01); *G06F 3/0482* (2013.01); *G06F 3/04842* (2013.01);
(Continued)

(58) Field of Classification Search
CPC ........ H04M 3/42102; H04M 3/12059; H04M 3/436; H04M 3/4365; H04M 3/51; H04M 3/53; H04M 3/533; H04M 3/54; H04M 3/541; H04M 3/58; H04M 1/663; H04M 2242/22; H04M 2203/2011; H04Q 3/0029; H04Q 3/0033; G06F 3/0482; G06F 3/04842; H04L 51/046; H04L 51/10; H04L 65/60; H04L 67/10; G06Q 10/06; G06Q 10/06311; G06Q 30/0601
USPC ............. 379/68, 70, 210.02, 210.03, 211.01, 379/212.01, 221.01, 214.01
See application file for complete search history.

(56) References Cited

U.S. PATENT DOCUMENTS 5,467,388 A * 11/1995 Redd, Jr. ............... H04M 1/663
379/196
5,473,671 A * 12/1995 Partridge, III ................ 455/445
(Continued)

*Primary Examiner* — Antim Shah
(74) *Attorney, Agent, or Firm* — Troutman Sanders, LLP; James E. Schutz; Christopher C. Close, Jr.

(57) ABSTRACT

A networking system may comprise a web site serviced by a web server assembly. The web site may generally comprise a combination of the following components: a crediting system, a chat bidding system, a performance bidding system, a telephony switching system, a media interaction system, a display system, a photo management system, and a messaging system. An exemplary embodiment of the chat bidding system may comprise a plurality of common user accounts, a queue, and a featured user account. Common users of the common user accounts may pose tasks to the featured user, and may make a pledge for each task. The tasks may be stored in, and sorted by, the queue based on their pledges. A featured user of the featured user account may be presented with a highest ranked task in the queue, and may choose to respond to the task or to skip the task.

21 Claims, 24 Drawing Sheets

Related U.S. Application Data

(60) Provisional application No. 61/059,444, filed on Jun. 6, 2008, provisional application No. 60/974,723, filed on Sep. 24, 2007.

(51) Int. Cl.
  *G06Q 30/06* (2012.01)
  *G06F 3/0482* (2013.01)
  *G06F 3/0484* (2013.01)
  *H04L 12/58* (2006.01)
  *H04L 29/06* (2006.01)
  *H04L 29/08* (2006.01)

(52) U.S. Cl.
  CPC ....... *G06Q 10/06* (2013.01); *G06Q 10/06311* (2013.01); *G06Q 30/0601* (2013.01); *H04L 51/046* (2013.01); *H04L 51/10* (2013.01); *H04L 65/60* (2013.01); *H04L 67/10* (2013.01)

(56) References Cited

U.S. PATENT DOCUMENTS

| | | | | |
|---|---|---|---|---|
| 6,157,829 | A * | 12/2000 | Grube et al. | 455/414.1 |
| 7,046,782 | B2 * | 5/2006 | Miller | H04M 1/663 379/207.14 |
| 7,155,001 | B2 * | 12/2006 | Tiliks | H04M 3/38 379/196 |
| 7,317,787 | B2 * | 1/2008 | Crockett | H04M 3/38 379/88.03 |
| 2003/0043983 | A1 * | 3/2003 | Pelletier | H04M 15/06 379/142.01 |
| 2004/0247105 | A1 * | 12/2004 | Mullis et al. | 379/211.02 |
| 2005/0129206 | A1 * | 6/2005 | Martin | 379/211.01 |
| 2007/0081649 | A1 * | 4/2007 | Baudino et al. | 379/201.11 |
| 2007/0269035 | A1 * | 11/2007 | Joy | H04M 3/436 379/210.02 |

* cited by examiner

100
SYSTEMS AND METHODS FOR SCREENING COMMUNICATIONS BASED ON RECEIVER PROGRAMMABLE PINS

CROSS-REFERENCE TO RELATED APPLICATIONS

This application is a continuation of U.S. patent application Ser. No. 12/237,316, filed 24 Sep. 2008, which claims priority and a benefit under 35 U.S.C. §119(e) of U.S. Provisional Patent Application 60/974,723, filed 24 Sep. 2007, and U.S. Provisional Patent Application 61/059,444, filed 6 Jun. 2008. The disclosures of all of these prior applications are hereby incorporated by reference as if fully set forth below.

BACKGROUND

1. Technical Field

Various aspect of the present invention relate to social and professional networking and, more particularly, to interactive networking systems for enabling interaction between one or more classes of users.

2. Description of Related Art

Conventional social and professional networking systems enable users to interact with one another via various networking protocols. These systems provide a variety of services, but they generally lack the ability to classify a user's network of contacts to provide varying levels of communication capabilities among different levels of users.

Such conventional systems are also not designed for serving as social or professional networking and communications platforms where certain individuals are highly sought after communication partners. For example, while celebrities are able to register and utilize conventional networking systems to communicate directly with their friends and acquaintances, celebrities do not currently have the ability to selectively allow communications from their fans.

These conventional systems are also generally limited in how they allow various users to communicate. For example, conventional systems generally limit inter-user communications to chat rooms, message boards, and/or private email messages.

Therefore, there is a need in the art for a system that provides increased communications capabilities.

There is also a need for a networking system whereby users can control communication capabilities pertaining to communications with other users, where such controls may be at least partially based on a class of such users.

There is a further need for such a networking system having safety controls enabling member interactions while allowing a receiving party to establish criteria controlling receipt of communications.

There is a further need for such a networking community, in which celebrities may communicate directly with fans in a virtual environment providing real-time interaction.

It is to such a networking system that that the present invention is directed.

SUMMARY

Exemplary embodiments of the present invention may include interactive networking systems providing various communication features. Such embodiments may allow multiple user classes. In an exemplary embodiment, the networking system may comprise any or all of various components, including a crediting system, a chat bidding system, a performance bidding system, a telephony switching system, a media interaction system, a display system, a photo management system, and a messaging system.

To enable operation of such components of the networking system, the networking system may additionally comprise a server assembly. The server assembly may comprise one or more web servers for hosting the web site. A user may interact with the web site through a web client adapted to display the web site. The web client may receive requests from the user and direct such requests to the server assembly. The server assembly may call various operations or programs to implement components and operations of the web site. The server assembly may send responses to user requests through the web client to the user.

Each user of the web site may have, or be associated with, a user account for accessing the web site. According to the crediting system of the networking system, each user account may be associated with a credit account for purchasing services from the web site. The credit account may represent virtual funds for use on the web site.

The chat bidding system, if included, may enable common users to pose tasks to a featured user in an organized manner. The chat bidding system may generally comprise a featured user, a plurality of common users, and a tasks queue.

The featured user may represent a person or entity in which the common users have interest. For example, the featured user may be a celebrity, a doctor, a counselor, or the like. The featured user may use a featured user account to interact with the web site.

The common users may have an interest in the featured user. For example, the common users may be fans of the featured user. Through the chat bidding system, the common users may pose tasks to the featured user. A common user may pledge credits for a task, thereby associating the task with a bid value. The amount of the bid value may be debited from the user's credit account.

The tasks queue may comprise hardware, software, or a combination thereof, in communication with the server assembly. The tasks queue may organize the tasks in an order corresponding to the bids associated with the tasks.

Through a web client in communication with the server assembly, the featured user may be presented with the tasks in an order determined by the tasks queue and, therefore, determined by the bids associated with the tasks. For each presented task, the featured user may dispatch the task by responding to or skipping the task.

If included, the performance bidding system may enable users to perform on the web site in an organized manner. The performance bidding system may comprise a plurality of users and a performance queue.

Each user may request an opportunity to perform, and may associate such request with a bid. The bid value may represent a number of credits deducted from the user's account in return for the user's performance.

The performance queue may comprise hardware, software, or a combination thereof, in communication with the server assembly. The performance queue may organize the performance requests in an order corresponding to the bids associated with the requests. A user may be allowed to perform on the web site when the user's request reaches a top of the queue.

If included in the web site, the telephony switching system may enable anonymous contact between two parties having user accounts on the web site. The telephony switching system may generally comprise a first communication device, a second communication device, a service center, and a telephony switch.

The first communication device and second communication device may be registered with the service center, and such registration may occur over the web site. Each registration may include a set of contact rules specifying who may connect to the applicable communication device, and when such connections may occur.

A first user associated with the first communication device may request a connection to a second user associated with the second communication device. The service center may receive the request and, based on the contact rules, may determine whether the requested connection is allowed.

The telephony switch may be in communication with the service center. If the requested connection is allowed, the service center may forward the connection request to the telephony switch. In turn, the telephony switch may connect the first communication device to the second communication device. Accordingly, the two communication devices may be connected to each other without phone numbers of either communication device being shared with the other communication device.

If included in the web site, the media interaction system may enable a first user to interact with a second user by extending a media object to the second user. The media object may be customizable, and may comprise various media, including animations, audio, or text. The media object may overlay other objects displayed on a client computer of the first user and a client computer of the second user.

If included, a display system may enable color and theme changes of the web site as viewed by a web client. Based on a user request, a color scheme and theme of the web site may be altered in response to a user request.

The photo management system, if included in the web site, may enable users of the web site to manage and edit digital images stored on the server assembly. The photo management system may comprise an image library and an image editor. The image library may contain images selected or created by a particular user, and the image editor may enable the user to edit images in the image library.

Additionally, a messaging system, if included, may enable a first user to leave a message on a virtual message board of a second user. The messaging system may comprise a message area, one or more graphical tools, and a color selector. The first user may select a graphical tool and a color, and may then modify an image of the message area in a manner customizable based on the chosen graphical tool and color.

These and other objects, features, and advantages of the interactive networking system will become more apparent upon reading the following specification in conjunction with the accompanying drawing figures.

DETAILED DESCRIPTION

Figure 1:
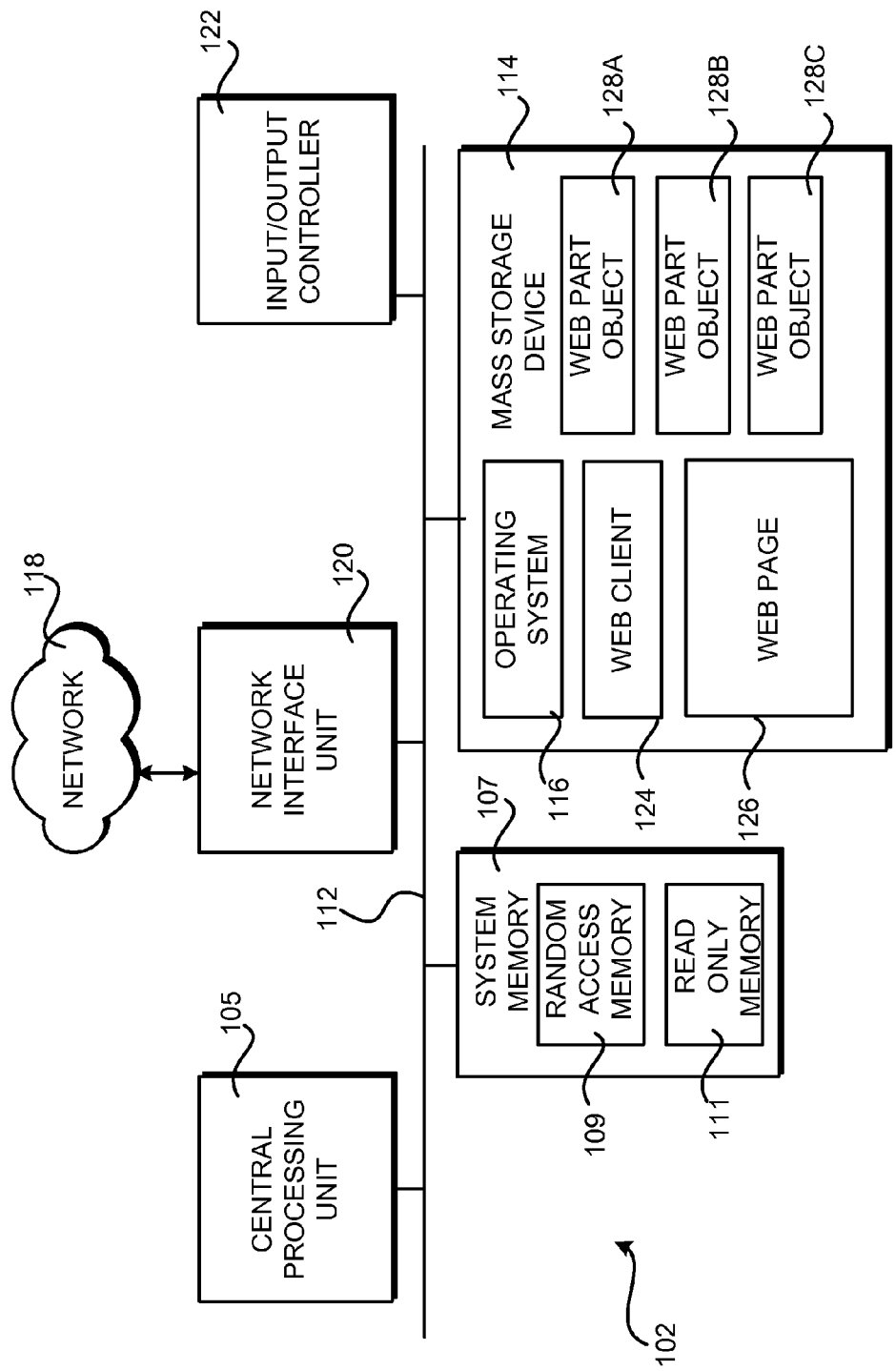
FIG. 1 illustrates an architecture of a client computer utilizing an interactive networking system, in accordance with an exemplary embodiment of the present invention.

To facilitate an understanding of the principles and features of the invention, various illustrative embodiments are explained below. In particular, the invention is described in the context of being a web-based interactive networking system for celebrities and their fans. Embodiments of the invention, however, are not limited to web-based implementations, or to use by celebrities and fans. Rather, embodiments of the invention may be used for networking and interaction between various entities and individuals in various environments. For example, and not limitation, doctors, counselors, sports figures, and politicians may benefit from the embodiments of the invention.

Throughout the present description, the present invention is described as embodied in a web environment. However, those of skill in the art will recognize that the concepts of the invention are not limited to a web environment and could be applied to various other systems. Accordingly, reference to web components is for convenience, and such references should not be considered limiting.

For example, and not limitation, embodiments of the present networking system may be implemented in media centers, video game consoles, operating systems, and virtual machines. Media centers may include television, telephone, and internet technologies, any of which may utilize various embodiments of the present networking system. Further, video game consoles now implement social networking, internet communications, video recording, and digital file downloading. Interactive networking may be useful in such video consoles, and may be provided by embodiments of the present networking system. Operating systems, such as Linux™, Mac OS X™, and Microsoft Windows™, enable certain technologies to be implemented within the operating system outside of the framework of the World Wide Web. Accordingly, embodiments of the networking system may be utilized in such operating systems without use of the World Wide Web. In addition, technologies such as Java™ and Adobe Air™ allow functionality outside the scope of the World Wide Web, in the context of "virtual machines," which may utilize the present networking system.

Exemplary embodiments of the networking system may contain components that may be utilized in a wide variety of applications. Some exemplary embodiments may be for personal entertainment, and others may be for professional use. Professional uses of the networking system may include, without limitation, medical personnel recruiting, educational applications, and various other applications matching persons to persons, persons to services, or persons to products. The networking system may comprise various classes of users, and may enable one or more user classes to control access and duration of interaction between themselves and users of one or more other user classes.

The components described hereinafter as making up various elements of the invention are intended to be illustrative and not restrictive. Many suitable components that would perform the same or similar functions as components described herein are intended to be embraced within the scope of the invention. Such other components not described herein may include, but are not limited to, for example, components developed after development of the invention.

Various embodiments of the present invention comprise interactive networking systems. Referring now to the figures, wherein like reference numerals represent like parts throughout the views, various embodiments of the networking system will be described in detail.

Figure 3:
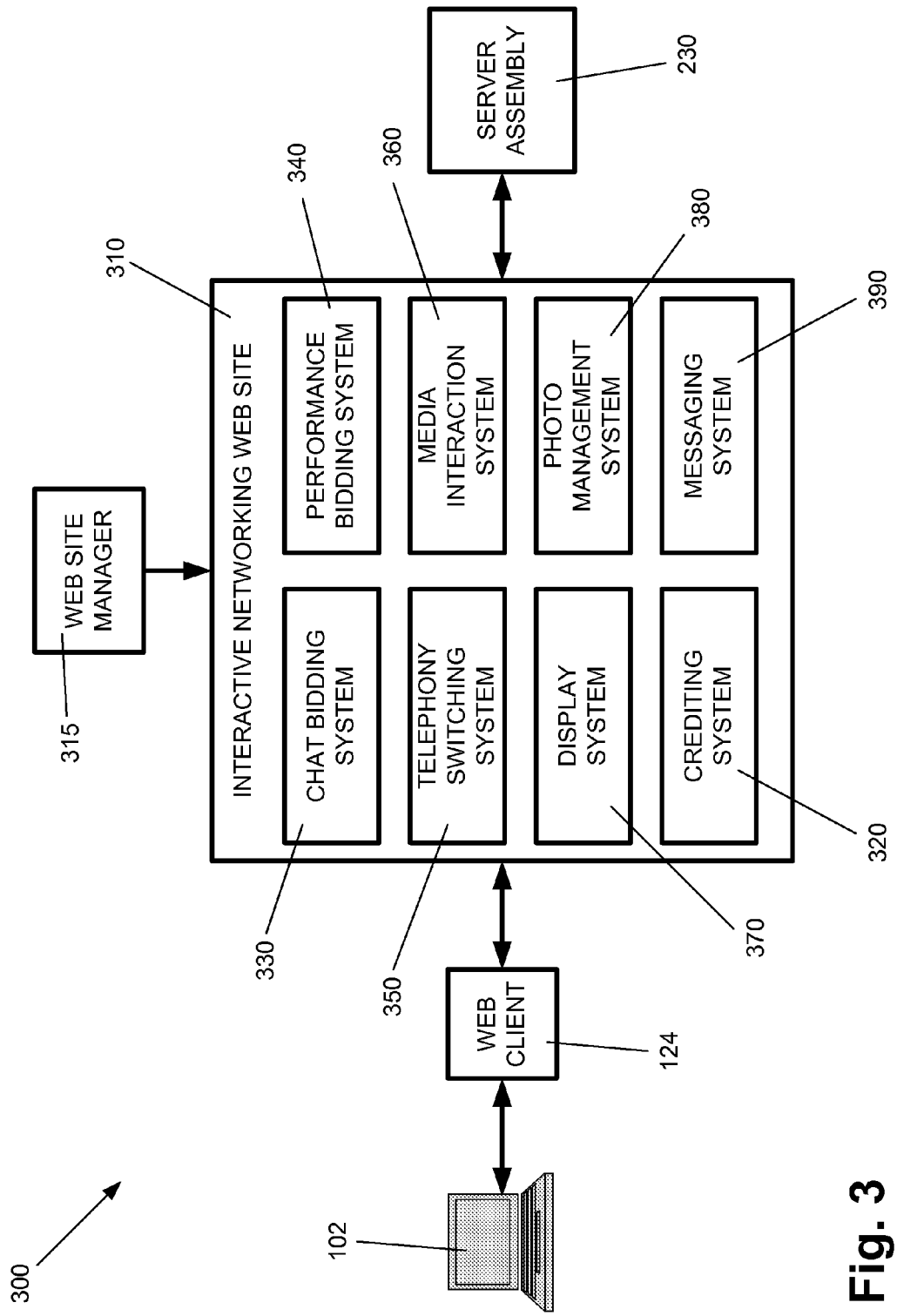
FIG. 3 illustrates a block diagram of the networking system, according to an exemplary embodiment of the present invention.

FIG. 1 illustrates a computer architecture for a client computer 102, in accordance with an exemplary embodiment of the present invention. The client computer 102 may be used to access the web site 310 (FIG. 3). Those skilled in the art will recognize that the general architecture described with reference to FIG. 1 is for example only, and may be modified to accommodate various embodiments of the networking system and particular operational environments. As shown in FIG. 1, the client computer 102 may comprise a central processing unit 105 ("CPU") and one or more system memories 107, such as a random access memory 109 ("RAM") and a non-volatile memory, such as a read-only memory ("ROM") 111. The client computer 102 may further comprise a system bus 112 coupling together the memory 107, the CPU 5, and various other components. A basic input/output system containing routines to assist in transferring information between components of the client computer 102 may be stored in the ROM 111. Additionally, the client computer 102 may include a mass storage device 114 for storing an operating system 116, application programs, and other program modules.

Figure 2:
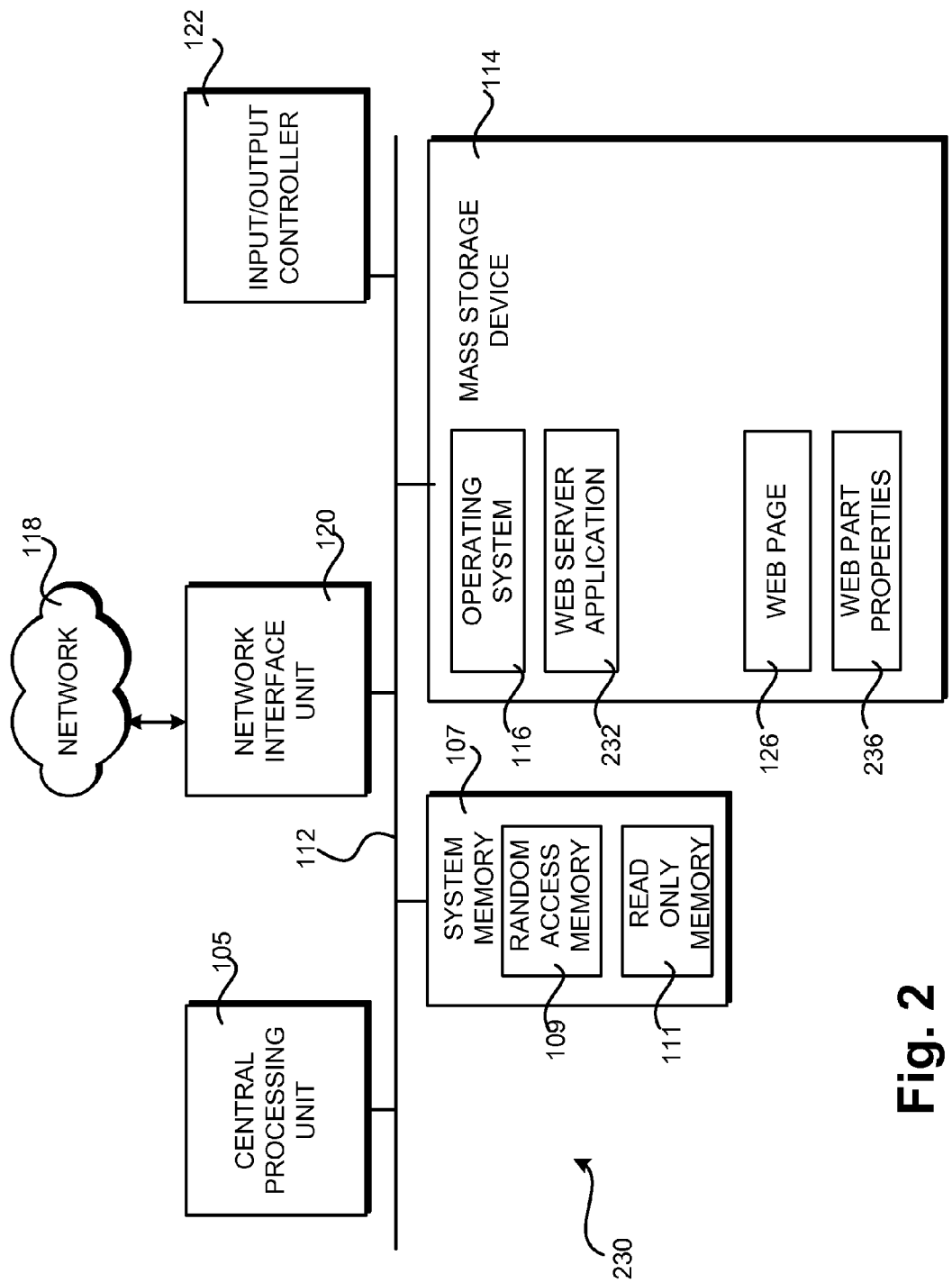
FIG. 2 illustrates an architecture of a server assembly of the networking system, according to an exemplary embodiment of the present invention.

The mass storage device 114 is generally connected to the CPU 105 through a mass storage controller (not shown) connected to the bus 112. The mass storage device 114 and its associated computer-readable media provide non-volatile storage for the client computer 102. Although the description of computer-readable media contained herein generally refers to a mass storage device, such as a hard disk or CD-ROM drive, it will be appreciated by those skilled in the art that computer-readable media may include any available media accessible by the client computer 102 or a server assembly 230 (FIG. 2).

By way of example, and not limitation, the computer-readable media may comprise computer storage media and communication media. Computer storage media may include volatile and non-volatile, removable and non-removable media implemented in any method or technology for storage of information, such as computer-readable instructions, data structures, program modules, or other data. Computer storage media includes, but is not limited to, RAM, ROM, EPROM, EEPROM, flash memory, other solid state memory technology, CD-ROM, digital versatile disks ("DVD"), other optical storage, magnetic cassettes, magnetic tape, magnetic disk storage, other magnetic storage devices, or any other media that may be used to store the desired data and may be accessible by the client computer 102 or the server assembly 230. Computer-readable instructions on the storage media of the client computer 102 may include, for example, instructions for implementing processes, preferably client-side processes, of the networking system 300.

According to various embodiments, the client computer 102 may operate in a networked environment using logical connections to remote computers, such as the server assembly 230, through a network 118, such as the Internet. The client computer 102 may connect to the network 118 through a network interface unit 120 connected to the bus 112. It will be appreciated that the network interface unit 120 may also be utilized to connect to other types of networks and remote computer systems.

The client computer 102 may also include an input/output controller 122 for receiving and processing input from a number of other devices, including a keyboard, mouse, or electronic stylus. The input/output controller 122 may provide output to a display screen, a printer, or other type of output device.

A number of program modules and data files may be stored in the mass storage device 114 and RAM 109 of the client computer 102. Such program modules and data files may include an operating system 116 suitable for controlling operations of a networked personal computer. A web browser application program, or web client 124, may also be stored on the mass storage device 114 and the RAM 109. The web client 124 may comprise an application program for requesting and rendering web pages 126 created in Hypertext Markup Language ("HTML") or other types of markup languages. The web client 124 may also be capable of executing scripts through the use of a scripting host. The scripting host executes program code expressed as scripts within the browser environment.

The web client 124 may be operative to execute one or more client side objects. As discussed briefly above, client side objects are executable objects that may be identified in a web page 126 and executed in conjunction with the rendering of the web page 126. For instance, Java™ applets or ActiveX™ controls may be identified on a web page 126 and rendered by the web client 124 to generate a portion of the web page 126 display.

According to an exemplary embodiment of the invention, the web client 124 may be further operative to utilize client side objects called web part objects 128A-128C, or web parts. Web part objects 128A-128C are reusable client side objects that stand and contain web-based content such as Extensible Markup Language ("XML"), HTML, and scripts. Web parts 128A-128C have a set of standard properties that control how they are rendered. These properties enable web parts to be storage-neutral and reusable. Because web parts 128A-128C adhere to a common standard, they may be stored in libraries, which may be utilized to create a variety of web pages 126. Web pages 126 that include web part objects 128A-128C may be referred to herein as web part pages.

Referring now to FIG. 2, a server assembly 230 utilized in various exemplary embodiments of the networking system 300 (FIG. 3) will be described. The server assembly 230 may service the web site 310 by receiving and responding to requests from web clients 124. The server assembly 230 may comprise various combinations of hardware and software for servicing the web site 310. Those skilled in the art will recognize that the server assembly 230 described in FIG. 2 is an exemplary server configuration and may be modified to accommodate various embodiments of the networking system 300. As shown in FIG. 2, the server assembly 230 may include many of the conventional computing components included in the client computer 102 and described above with respect to FIG. 1. In particular, the server assembly 230 may include a CPU 105, a network interface unit 120 connected to a network 118, such as the Internet, a system memory 107, and a mass storage device 114.

The mass storage device 114 utilized by the server assembly 230 may typically be operative to store an operating system 116 suitable for servicing the web site 310 and controlling operations of a server computer. The mass storage device 114 and its associated computer-readable storage media provide non-volatile storage for the server assembly 230. Computer storage media may include volatile and non-volatile, removable and non-removable media implemented in any method or technology for storage of information, such as computer-readable instructions, data structures, program modules, or other data. Computer-readable instructions on the computer-readable media of the server assembly 230 may include, for example, instructions for implementing processes, preferably server-side processes, of the networking system 300.

The server assembly 230 may utilize a web server application 232. The web server application 232 may receive and respond to requests from web clients 124 at remote computers, such as the client computer 102, for web pages 126 located at or accessible to the server assembly 230. It will be appreciated that web pages 126, as described herein, include both those pages stored statically and utilizing only HTML, as well as pages generated dynamically through use of server-side scripting technologies.

According to various embodiments of the networking system 300, the web server application 232 may receive requests for web pages 126 that include one or more web parts 128A-128C. As discussed above, web parts 128A-128C comprise client-side objects that may be used by the web client 124 when displaying a web page 126.

FIG. 3 illustrates a block diagram of the networking system 300, according to an exemplary embodiment of the present invention. The networking system 300 may operate in an environment of the client computer 102 and the server assembly 230. As shown in FIG. 3, an exemplary embodiment of the networking system 300 may comprise an interactive networking web site 310, the server assembly 230, and a web site manager 315. The client computer 102 may interact with the web site 310 and, accordingly, the server assembly 230 through the web client 124 at the client computer 102.

The web site 310 may enable interaction between and among one or more featured users and a plurality of common users. The featured users may interact with one another via the web site 310, and similarly, the common users may interact with one another via the web site 310. Additionally, the common users may desire some level of interaction with the featured users, and the featured users may desire some level of privacy in their interactions with the common users. For example, a featured user may be a celebrity, and a set of common users may be fans of the celebrity. The web site 310 may provide a virtual environment for such interactions.

The server assembly 230 may service the web site 310. The server assembly 230 may operate as discussed in detail above, or in various manners for providing services to client computers 102 over a network.

The web site manager 315 may manage the web site 310, act as administrator of the web site 310, and provide customer service to users of the web site 310. Preferably, the web site manager 315 may be one or more humans or entities, but may also comprise computing devices and automated services.

The web site 310 may generally comprise any combination of the following components: a crediting system 320, a chat bidding system 330, a performance bidding system 340, a telephony switching system 350, a media interaction system 360, a display system 370, a photo management system 380, and a messaging system 390. Each component of the web site 310 may provide various services as described further below.

Crediting System

The web site 310 may provide a crediting system 320 for providing users a means to purchase services of the web site 310. Each user may have a user account, and the user account may be associated with the user's history of activities on the web site 310. According to the crediting system 320, the user account may include a credit account representing virtual credits allotted to the user. The credits may be used to purchase services from the web site 310, or products and services from entities associated with the web site 310.

The web site 310 may provide multiple categories of credits, such as universal credits and limited credits. Universal, or non-promotional, credits may be purchasable by the user. The user may purchase universal credits from the web site manager 315 via the web site 310, over a phone call, or via various other means of communicating a desire to purchase credits. In contrast, limited, or promotional, credits may be awarded to the user based on promotions. The web site 310 may separately account for universal and limited credits. However, the web site 310 may present the user with either a combined total of credits or with separate totals for each of universal and limited credit accounts. As mentioned above, various services of the web site 310 may be purchased with credits. Preferably, predetermined exclusive services of the web site 310 may be purchased only with universal credits, while non-exclusive services may be purchased with universal credits, limited credits, or various combinations thereof.

The web site 310 may provide various categories of user membership. For example, and not limitation, the web site 310 may provide featured user accounts for featured users and common user accounts for common users. Preferably, at least the common users may purchase services through the web site 310 with their credit accounts. Such services may include opportunities to interact with the featured users. Purchasable services may be services of the chat bidding system 330, the performance bidding system 340, the telephony switching system 350, the media interaction system 360, the display system 370, the photo management system 380, the messaging system 390, and/or other web service systems.

For purchase of services on the web site 310, the web site 310 may implement a predetermined scheme for determining which credits are debited from the purchasing user's credit account. For example, and not limitation, a purchase of an exclusive service may automatically debit the user's universal credits. For a purchase of a non-exclusive service, the user may be allowed to specify which credits are debited for the purchase. Alternatively, the web site 310 may implement a first-in-first-out accounting, in which the first credits placed into the user's credit account are the first credits debited from the users account, or a last-in-first-out accounting, in which the last credits placed in the user's account are the first credits debited from the user account. As another option, the web site 310 may automatically debit any available limited credits before universal credits for the purchase of non-exclusive services.

Through the use of credit accounts, common users may interact with featured users, and as a result, common users, featured users, and the web site manager 315 may profit from such interaction. Common users may benefit by fulfilling desires to interact with featured users, such as celebrities, who might otherwise be inaccessible to the common users. Featured users may interact with common users and, thereby, increase their popularity and fan bases. Further, featured users may have agreements with the web site manager 315, whereby featured users share in revenues generated by the web site 310 or whereby the web site manager 315 donates revenues from the web site 310 to favored charities of the featured users. Additionally, the web site manager 315 may reap financial benefits through selling credits to common users.

Chat Bidding System

Figure 4:
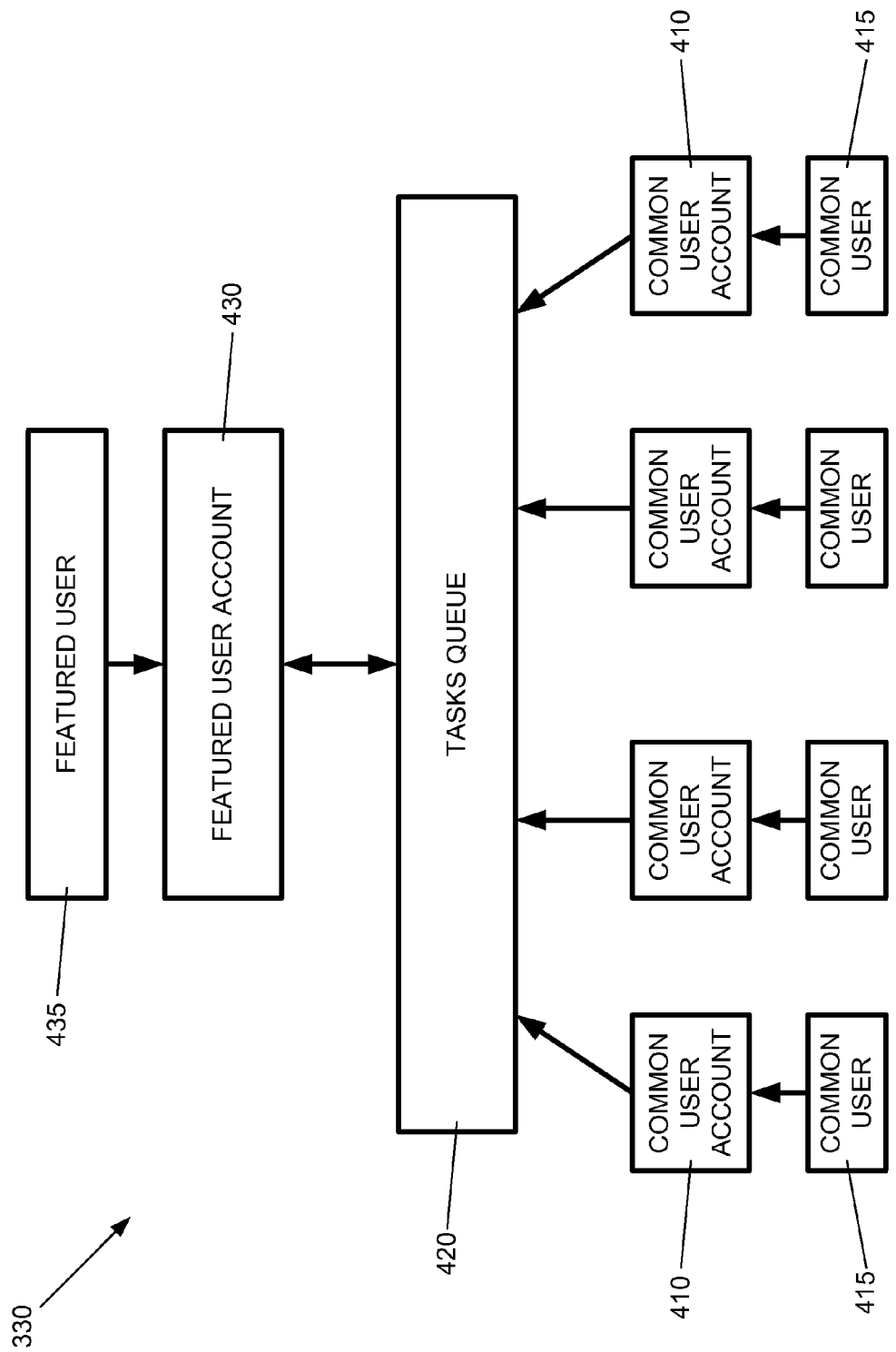
FIG. 4 illustrates a block diagram of a chat bidding system of the networking system, according to an exemplary embodiment of the present invention.

The chat bidding system 330 of the web site 310 may provide an organized community in which common users may interact with a featured user. FIG. 4 illustrates a block diagram of an exemplary chat bidding system 330 of the web site 310. As shown in FIG. 4, an instance of the chat bidding system 330, a chat bidding session, may comprise a plurality of common user accounts 410, a tasks queue 420, and a featured user account 430.

Each chat bidding session of the chat bidding system 330 may comprise a plurality of common users 415 and at least one, and preferably only one, featured user 435. Through common user accounts 410, the common users 415 may pose tasks to the featured user 435. The tasks queue 420 may store the posed tasks or references to the posed tasks. Through the featured user account 430, the featured user 435 may be presented with the tasks, preferably one at a time, and may choose whether to respond to each task as it is presented.

Figure 5:
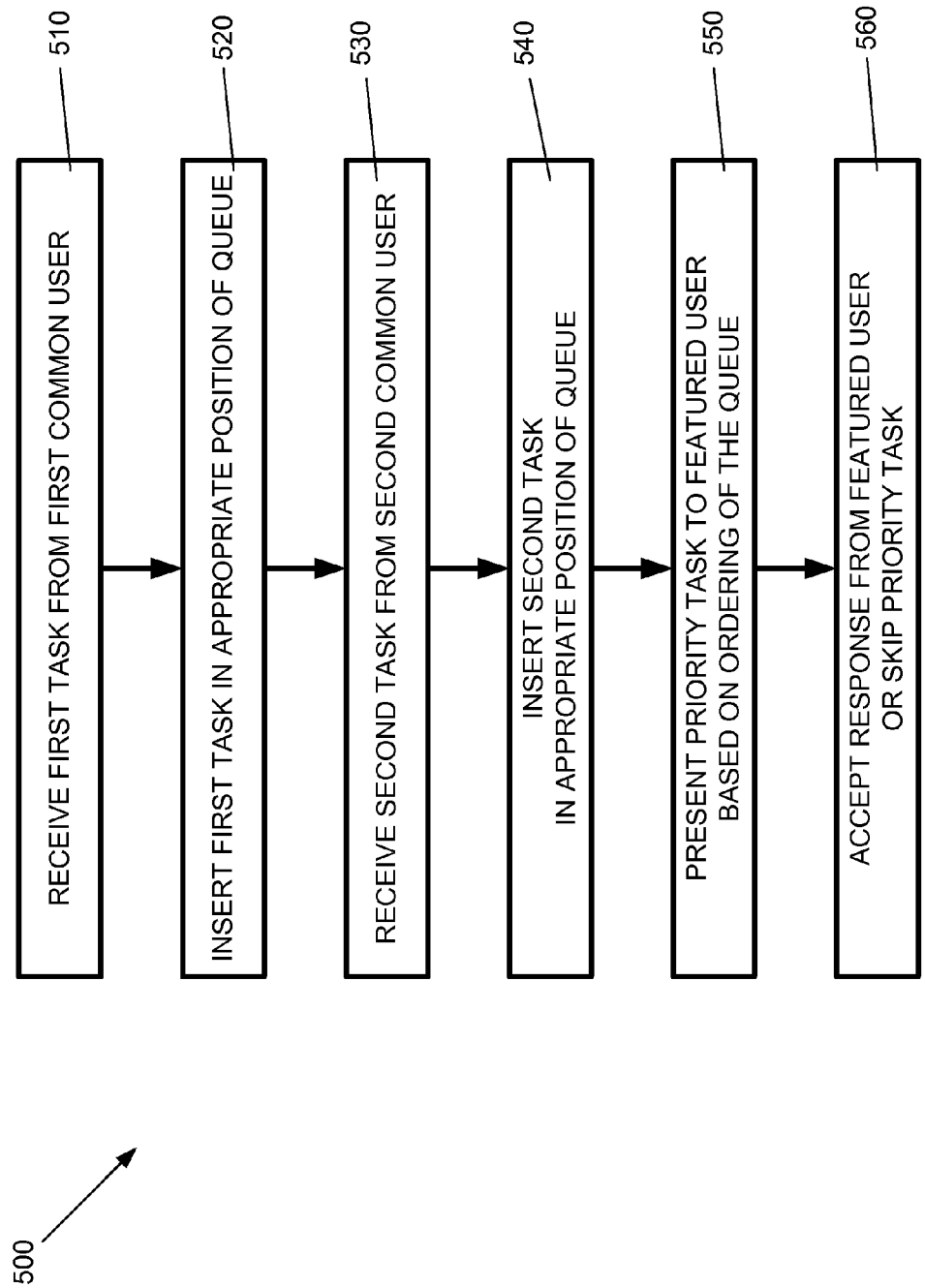
FIG. 5 illustrates a flow diagram of an operation of the chat bidding system of the networking system, according to an exemplary embodiment of the present invention.

FIG. 5 illustrates a flow diagram of an operation 500 of the chat bidding system 330 according to an exemplary embodiment of the networking system 300. As shown in FIG. 5, at 510, the web site 310 may receive a task posed by a first common user 415. The task may be accompanied by a pledge from the common user 415, and a bid value corresponding to the pledge may be associated with the task. At 520, the task may be inserted into an appropriate position of the queue 420 based on the task's associated bid value. A second task may be received from a second common user 415 at 530, and at 540, the second task may also be inserted into an appropriate position of the queue 420. At 550, the web site 310 may present the featured user 435 with a priority task, which is the task currently at the top of the ordered queue 420. The featured user 435 may choose to respond to the priority task, or to skip the priority task. In an exemplary embodiment of the chat bidding system 330, common users 415 whose tasks are skipped may receive refunds for their pledged credits. At 560, the web site 310 may respond according to the featured user's decisions to skip or respond to the priority task. This may comprise accepting the featured user's response to the task or indicating that the priority task has been skipped.

Referring now back to FIG. 4, the common users 415 may pose tasks to the featured user 435. Each task may comprise a question, comment, or request of the posing common user 415. In posing a task, a common user 415 thereby requests that the featured user 435 respond to the posed task. Tasks may be posed in various formats. For example, a task may be a typed question, an audio challenge or other request, or various other formats for prompting a response from the featured user 435. The web site 310 may receive the tasks and, as described further below, may store the tasks in an ordered manner through use of the queue 420.

A common user 415 may associate a bid with a posed task. The bid is preferably a pledge of credits from the common user's credit account. In pledging a credit amount, the common user 415 may commit to purchase the featured user's response to the task for the pledged amount or, alternatively, may commit to purchase an opportunity to present the task to the featured user 435 for the pledged amount. If the common user 415 does not associate the task with a bid, a bid value for the posed task may be set to zero. A first exemplary embodiment of the chat bidding system 330 debits the common user's credit account regardless of whether the featured user 435 responds to the common user's task. An alternative exemplary embodiment of the chat bidding system 330, however, debits the credit account only if the featured user 435 is eventually presented with the common user's task or, alternatively, only if the featured user 435 responds to the common user's task.

The tasks queue 420 may store the tasks or references to the tasks. Storage space for the tasks queue 420 may be provided on the server assembly 230. In the tasks queue 420, tasks may be ordered based at least partially on their bid values. In other words, a first task with a first bid value may be ranked higher than a second task with a lower bid value. When a new task is posed by a common user 415, such new task may be inserted into the tasks queue 420 based on a ranking of the bid value of the new task. In an exemplary embodiment of the chat bidding system 330, if the new task has a bid value equal to a bid value of a previously-posed task already in the tasks queue 420, the new task may be ranked behind the previously-posed task. The web site 310 may notify the common user 415 of positions of his tasks in the queue 420. Additionally, the web site 310 may allow the common user 415 to alter the bid values of his tasks and, thereby, potentially modify the positions of his tasks in the tasks queue 420. The web site 310 may also display to the common user 415 an amount of credits required to increase a task of the common user 415 to a certain rank in the tasks queue 420. Preferably, bids for previously submitted tasks may be increased but not decreased.

A predetermined number of highest ranked tasks in the queue 420 may have a fixed ranking order at the top of the queue 420. For example, and not limitation, the top N tasks may be fixed such that a bid modification of a previously lower-ranked task may not affect the positions of such top N tasks. Further, the top N tasks may be presented to the featured user 435, according to their rank amongst the other top N tasks.

In some implementations of the chat bidding system 330, fixing ranks of the top N tasks may entail removing the top N tasks from the tasks queue 420, and inserting them into a standby queue. Tasks in the standby queue may be ordered according to when they were removed from the tasks queue 420, and may be presented to the featured user 435 in an order in which they were inserted into the standby queue. In other words, the standby queue may be a first-in-first-out queue, and after a task is removed from the standby queue for presentation to the featured user 435, a highest ranked task in the tasks queue 420 may be removed from the tasks queue 420 and inserted into the standby queue. In other implementations, fixing ranks of the top N tasks may entail setting fixed positions for such top N tasks within the queue 420 and restricting resorting of such tasks. In either of these implementations, any resorting or rearranging of the queue 420 may not affect the positions of the top N tasks.

Those skilled in the art will recognize that a queue may be implemented in various manners and through use of various data structures. Those skilled in the art will further recognize that a queue may refer to certain types of related data, which may, but need not, be stored in contiguous physical space. Accordingly, as used herein, the standby queue of the chat bidding system 330 may refer to a set of data stored distinct from the tasks queue 420, or to a set of data sharing physical space with the tasks queue 420.

Fixing ranks of the top N tasks may incentivise common users 415 to pledge high bid values for their tasks, because after such tasks reach a predetermined rank, their positions become fixed. Preferably, N is a small number, such as two. A large value of N may discourage common users 415 by making too many of the top positions unreachable.

To increase efficiency of the networking system 300, data regarding posed tasks may be stored on the client computer 102, in addition to the server assembly 230. A client-side application may run at the client computer 102, and may cache task data on the client computer 102. In an exemplary embodiment of the networking system 300, client-side caching may occur locally on the client computer 102 by storing task data in an array in the order in which the tasks were posed. The array may contain task data including, for example, question text, bid amount, and current position in the tasks queue 420. The order in which tasks are stored in the array may be retained when a web page of the chat bidding session is reloaded. The client-side cache may be updated at various occurrences, such as a rank change or an update to task text or bid amount.

The web site 310 may present the featured user 435 with the priority task. The priority task may be the highest ranked task in the tasks queue 420. Alternatively, if the top N tasks are removed from the tasks queue 420 and inserted into the standby queue, the priority task may be the highest ranked task in the standby queue. The featured user 435 may be able to view a predetermined number of other posed tasks in addition to the priority task, but preferably, the featured user 435 must act on the priority task before being presented with any other tasks. Also preferably, the featured user 435 may view only the top N tasks, which have fixed position in the order in which they will be presented to the featured user 435. In such embodiments, the featured user 435 may be permitted to select presented tasks out of order. For each viewable task, the featured user 435 may also view statistics related to the task, such as the associated bid value and how long the task has been in the queue 420.

After being presented with the priority task, the featured user 435 may choose to respond to the priority task or to skip the priority task. If the priority task is skipped, the featured user 435 may not have another opportunity to respond to such task unless it is again posed by a common user 415. By presenting the featured user 435 with each task only once, the web site 310 may provide an organized manner for the featured user 435 to handle a small or large number of tasks. Additionally, common users 415 may be encouraged that their tasks can eventually be presented to the featured user 435 and may, therefore, more confidently pledge credits towards their tasks to increase a possibility that their tasks will be viewed. In an alternative embodiment of the chat bidding system 330, however, the featured user 435 may be entitled to temporarily skip a task and have it represented later, preferably after the following task.

When a task becomes the priority task, the common user 415 who posed such task may become a featured common user 415. In that case, data relating to the featured common user 415 may be displayed to other common users 415 and to the featured user 435. Such data may include, without limitation, the featured common user's username and picture. Additionally, other users, both common 415 and featured 435, may have an opportunity to follow a web hyperlink and, thereby, view the featured common user's full profile on the web site 310. Accordingly, the featured common user 415 may be rewarded for his pledge in that all other parties may know who posed the priority task.

As mentioned above, the featured user 435 may choose to respond to the priority task. The type of response given by the featured user 435 may depend on the type of task posed. For example and not limitation, if the task is a question, the featured user 435 may answer the question, and if the task is a request, the featured user 435 may comply with the request. The web site 310 may receive the response of the featured user 435 in various ways. For example, the web site 310 may receive and display an answer to a question in the form of text. Alternatively, the web site 310 may receive the featured user's compliance with a tasked request through, for example, a webcam or other recording media.

In addition to the above functions of the featured user 435, a role of the featured user 435 may be similar to a role of a chat moderator. The featured user 435 may initiate the chat bidding session and may prompt tasks from the common users 415. When initiating a chat bidding session, the featured user 435 may select a charity to share in revenues generated by the chat bidding session. The featured user 435 may be able to change the benefiting charity during the chat bidding session. Credits deducted from credit accounts of the common users 415 for posed tasks represent revenues of the chat bidding session. In predetermined percentages, such revenues may be divided among the web site manager 315, the featured user 435, and, if indicated, the selected charity.

The featured user 435 may also have access to a synchronous alert tool on the web site 310. For example, when initiating a chat bidding session, the featured user 435 may issue a mass notification to all common users 415, or to a predetermined set of common users 415, to notify such common users 415 of the chat bidding session. In an exemplary embodiment of the chat bidding system 330, the synchronous alert tool issues a pop-up alert to common users 415.

A common user 415 may view various elements of the chat bidding session. For example, the web site 310 may display to the common user 415 a name and biography of the featured user 435. The web site 310 may also display responses for each task to the plurality of common users 415, as in a group chat session. In other words, if the featured user 435 responds to a task of a first common user 415, such response may be displayed to all common users 415 in a virtual group environment of the web site 310. Additionally, each common user 415 may view and scroll through his own posed tasks. The common user 415 may view the queue position of each of his tasks and may modify the bid amount of each of his tasks. Optionally, the common user 415 may also have access to a complete list of posed tasks from the plurality of common users 415. In some exemplary embodiments of the chat bidding system 330, a first common user 415 may be able to pledge his credits to a task posed by a second common user 415. Accordingly, the first common user 415 may increase the bid value and, potentially, the rank of a task of the second common user 415. Additionally, in such a scenario, the web site 310 may acknowledge both the second common user 415 and the first common user 415 when the task is featured and presented to the featured user 435.

Throughout the chat bidding session, the web site 310 may display various statistics related to the chat bidding session. For example, and not limitation, the web site 310 may display the total credits raised during the chat bidding session up to the current point in time, the time elapsed in the bidding session, the number of posed tasks not yet presented to the featured user 435, the name of the selected charity, the average time the featured user 435 has taken to act on or respond to each presented task, and the estimated time remaining in the chat bidding session. At any point in time, the featured user 435 may pause the chat bidding session and, thereby, pause any running clocks utilized for calculating statistics related to the chat bidding session.

Figure 6:
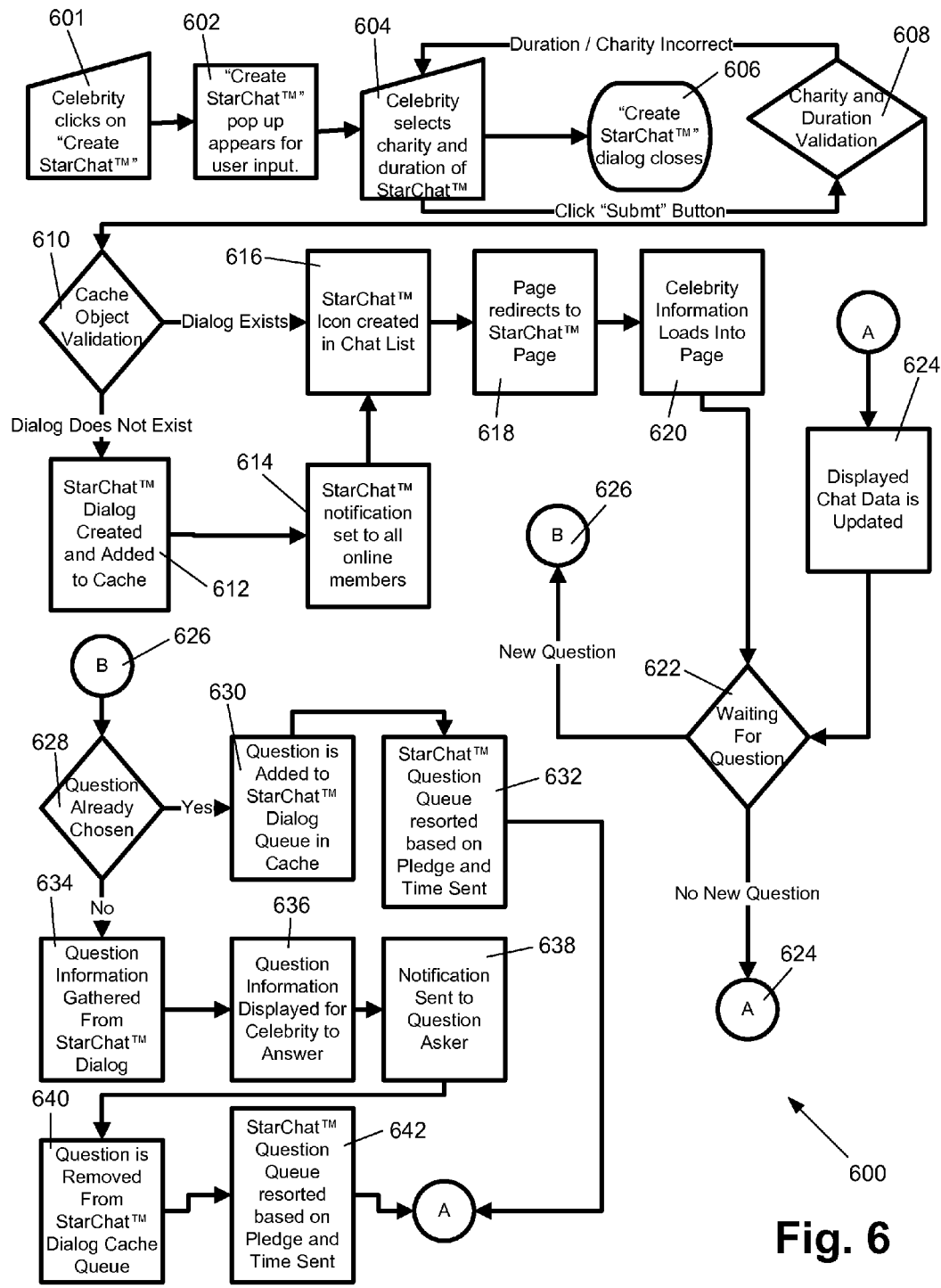
FIG. 6 illustrates a flow diagram of a process of a featured user initiating and participating in a chat bidding session of the chat bidding system, according to an exemplary embodiment of the present invention.

FIG. 6 illustrates a flow diagram of a process 600 of a featured user 435 initiating and participating in a chat bidding session, according to an exemplary embodiment of the chat bidding system 330 of the web site 310.

As shown in FIG. 6, at 601, the featured user 435, such as a celebrity, may initiate the chat bidding session. This may occur when the featured user 435 selects an appropriately labeled button, such as a button labeled "Create StarChat."

At 602, a pop-up or dialog may appear allowing the featured user 435 to create the new chat bidding session. At 604, the featured user 435 may select a charity to benefit from the chat bidding session, and may determine a duration for the chat bidding session. At 606 and 608, the networking system 300 may create the chat bidding session using the validated charity and duration selections.

Cache object validation may occur at 610. If a cache object does not exist, the networking system 300 may create a new cache object for managing the chat bidding session. To improve performance, the networking system 300 may cache objects on the server assembly 230 so that they can be used and manipulated quickly. Upon creation of a new chat bidding session, the networking system 300 may determine whether a dialog for a chat bidding session has already been created. If not, at 612, a chat bidding session dialog, in which tasks and responses may be displayed, is created and added to the cache. Then, the next time the dialog is requested, it may be retrieved from the cache. Upon creation of the new dialog, at 614, the networking system 300 may notify all online users of creation of the chat bidding session.

A new chat icon may be created at 616, and may be viewable by the common users 415. At 618, the networking system 300 may direct the featured user's web client 124 to a web page of the chat bidding session. At 620, the featured user's information, such as name and occupation, may be loaded into the chat bidding session for viewing by the common users 415. At 622, the featured user 435 may await questions and tasks from the common users 415. While there are no new questions or tasks, as shown at 624, certain data about the chat may automatically update. Such data may include, without limitation, elapsed time, average time to respond to a question or task, and estimated time remaining. Preferably, this data is maintained and displayed as needed and appropriate throughout the chat bidding session.

At 626, a process of acting on questions and other tasks of common users 415 may begin. The networking system 300 may determine whether a question or task has already been chosen by the featured user 435 at 628. At 630, if a question or task is already chosen, the question or task is added to the tasks queue 420 in cache to be stored for efficient future use. At 632, the tasks queue 420 may be re-sorted based on bid values relating to one or more newly inserted tasks.

Returning to 628, alternatively, if a question or task has not yet been chosen, a question or task may be retrieved, at 634, along with related data, such as data pertaining to the common user 415 who posed the question or task. At 636, the question or task data may be displayed so that the featured user 435 may respond. At 638, a notification may be sent to the common user 415 who posed the question or task, informing the common user 415 that his question or task is the priority task. At 640, this priority task may be removed from the tasks queue 420, and at 642, the tasks queue 420 may be updated to reflect that the priority task has been removed.

Figure 7A:
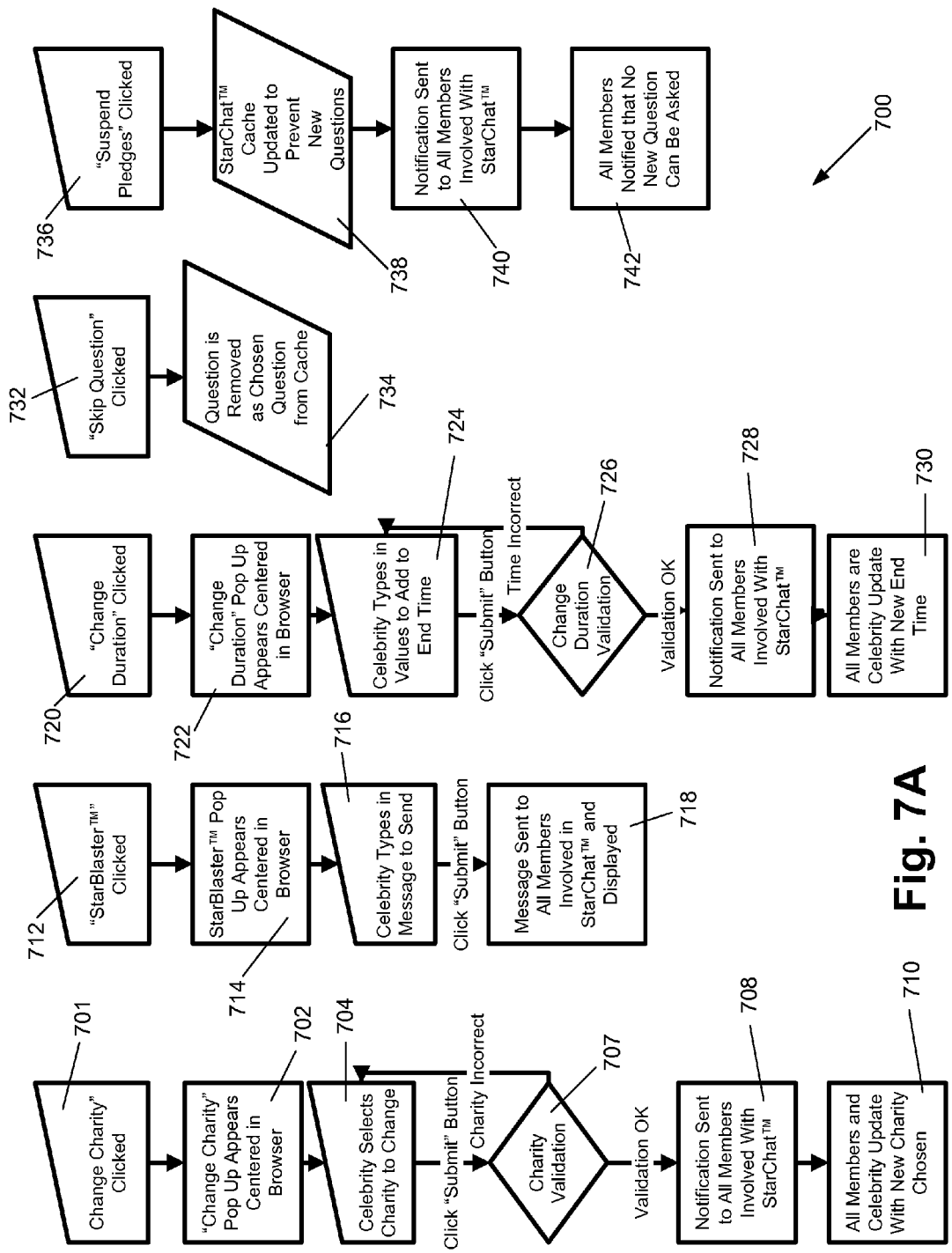
FIGS. 7A-7B illustrate flow diagrams of a process of the featured user moderating the chat bidding session of the chat bidding system, according to an exemplary embodiment of the present invention.
Figure 7B:
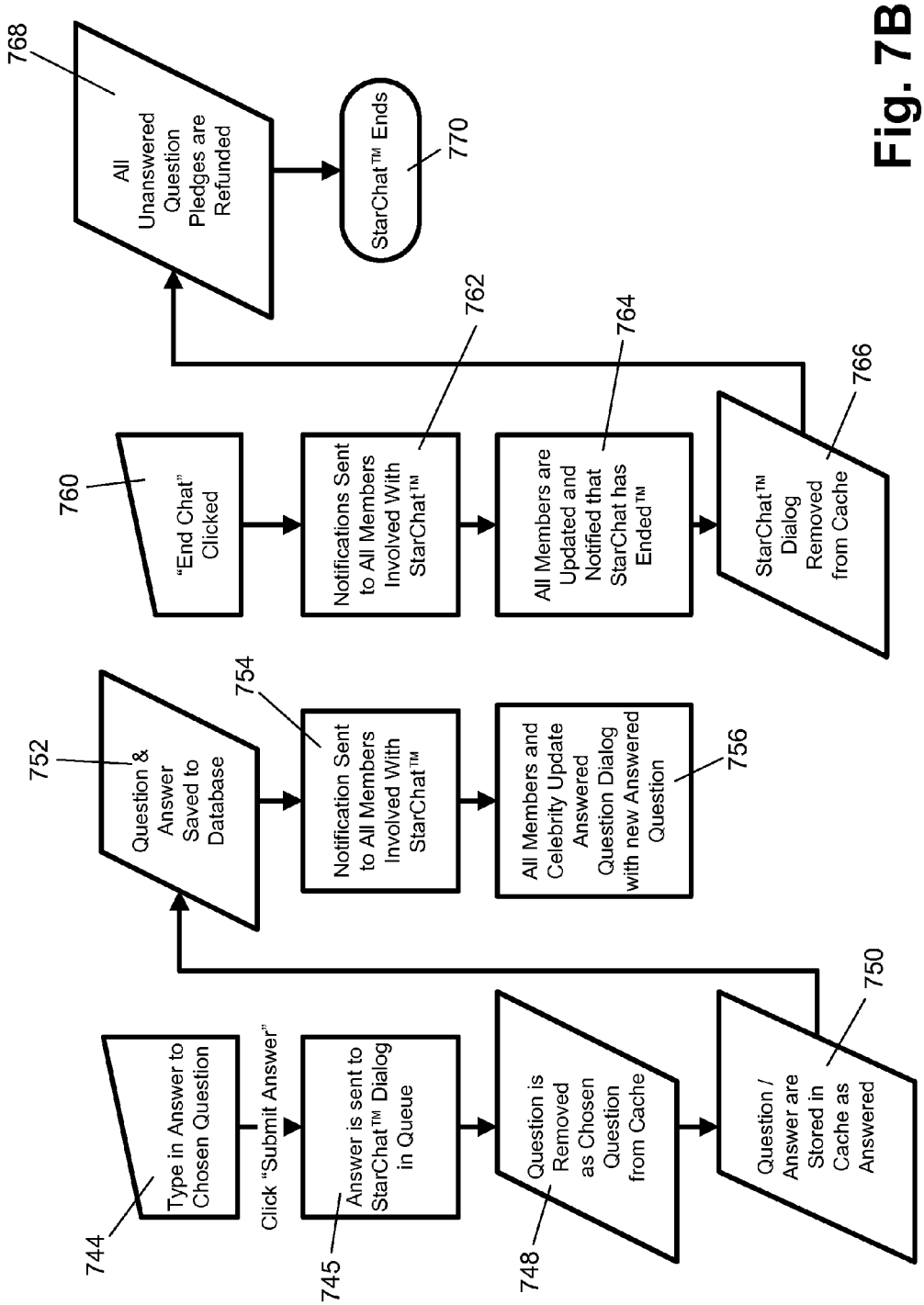

FIGS. 7A-7B illustrate flow charts depicting further exemplary functions 700 of the featured user 435 during the chat bidding session. At 701, if the featured user 435 previously elected a charity benefactor, the featured user 435 may change the selected charity from within the chat bidding session. Changing the charity may be initiated when the featured user 435 selects a "Change Charity" button at 702. Then, a pop-up or dialog may appear, enabling the featured user 435 to select a new charity. The pop-up or dialog may provide a list of approved charities from which the featured user 435 may choose. At 704, the featured user 435 may select a new charity, and the newly selected charity may be verified at 707. This validation step may include, for example, verifying that the charity is a valid charity associated with the featured user 435. At 708, a notification of the new charity may be transmitted to all common users 415 related to the chat bidding session, and 710, all common users 415 and featured users 435 may be updated with the newly selected charity.

In an exemplary embodiment of the present invention, changing the benefiting charity of a chat bidding session may not affect a distribution of the revenues generated through the chat bidding session before the change occurred. In other words, a first charity may benefit from the chat bidding session for the time period during which such first charity was specified as the benefiting charity. If the benefiting charity is changed to a second charity during a chat bidding session, only revenues after the change may be generated for the benefit of the second charity.

At 712, the featured user 435 may have an ability to use the synchronous alert feature. This feature, as discussed above, may enable the featured user 435 to send a message to all common users 415 participating in the chat bidding session. After selecting the synchronous alert feature, e.g. a "StarBlaster" button, at 712, a pop-up window may be presented to the featured user 435 at 714. At 716, the featured user 435 may provide and submit a message for the common users 415. At 718, the message may be transmitted to all common users 415 involved in the chat bidding session.

As mentioned above, the featured user 435 may have an ability to select the duration of the chat bidding session. At 720, the featured user 435 may change such duration. He or she may accomplish this by selecting a "Change Duration" button. At 722, a pop-up may appear, allowing the featured user 435 to modify the duration. At 724, the featured user 435 may enter the modified duration information, which may then be validated at 726. Upon approval of the new duration, a notification may be sent to all users in the chat bidding session at 728 and at 730. If the chat bidding session displays an end time to the common users 415, such end time may be updated in accordance with the new duration.

As at 732 and 734, the featured user 435 may skip the priority question or task. After the featured user 435 selects a "Skip Question" button at 732, the question or task may be removed from the cache at 734. Then, a new priority task may be presented to the featured user 435.

At 736, the featured user 435 may opt to end pledging in the chat session. For example, the featured user 435 may select a "Suspend Pledges" button. This option may prevent common users 415 from posing additional tasks, and may additionally prevent pledge increases for queued tasks. At 738, the cache may be updated in response to the featured user's indication that pledges are no longer allowed, and accordingly, the networking system 300 may no longer accept new questions or tasks from the common users 415. Next, at 740 and 742, a notification may inform the common users 415 that no new questions or tasks may be posed in the chat bidding session. In an exemplary embodiment of the chat bidding system 330, the featured user may be required to continue acting on posed tasks until all tasks with non-zero bid values are acted upon. Common users 415 whose tasks remain in the tasks queue 420 after the featured user 435 exits the chat bidding session may receive refunds for their pledged credits.

Turning to 744, an exemplary process of responding to a posed question or task is depicted. After the question or task is answered at 746, a response is displayed via the chat bidding session. At 748, the question or task may be removed from the cache, and at 750, the task and response may be stored in the cache as answered. At 752, the task and response, or question and answer, may also be stored in the database. Then, at 754, notification of such response may be sent to the common users 415 participating in the chat bidding session. At 756, common users 415 and featured users 435 may be informed that a response to the priority task has been issued, and the task and corresponding response may be available for viewing.

The featured user 435 may terminate the chat bidding session, such as by selecting an "End Chat" button at 760. After which, a notification may be issued to the common users 415 in the chat bidding session at 762. The common users 415 may then receive notification that the chat has ended at 764. At 766, a record of the chat bidding session dialog may be removed from the cache. At 768, all pledges associated with unanswered tasks may be voided when the chat bidding session ends at 770.

Figure 8:
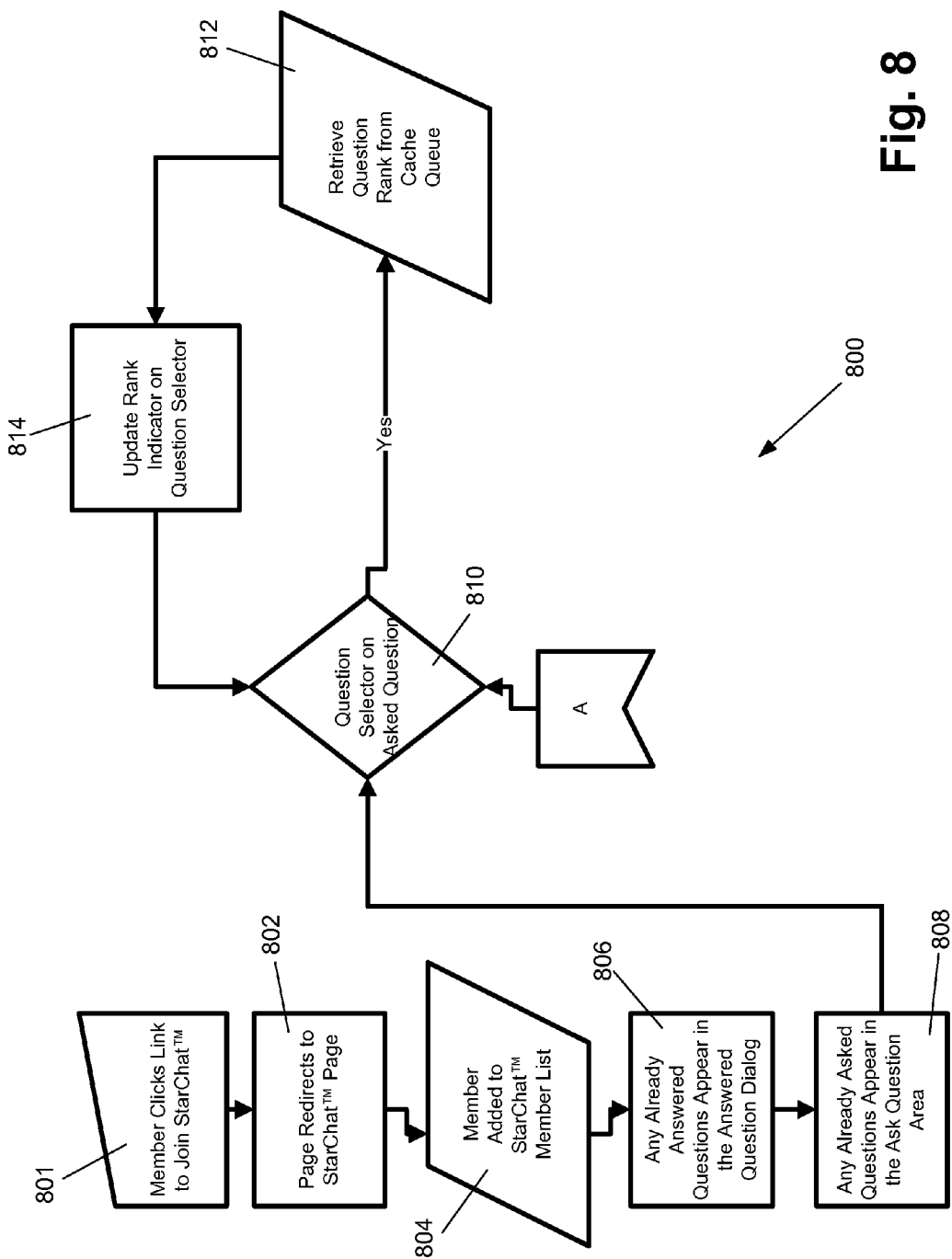
FIG. 8 illustrates a flow diagram of a process of a common user joining the chat bidding session of the chat bidding system, according to an exemplary embodiment of the present invention.

FIG. 8 illustrates an exemplary process 800 of a common user 415 joining and viewing an exemplary chat bidding session. As shown in FIG. 8, at 801, the common user 415 may elect to join a particular chat bidding session. At 802, the server assembly 230 may redirect the common user 415 to an appropriate web page for the chat bidding session, and the common user 415 may be added to a user list of the chat bidding session at 804. The common user 415 may then be presented with tasks to which the featured user 435 has previously responded in the chat dialog at 806. Additionally, questions and tasks to which the featured user 435 previously responded may appear in an "asked questions" area of the web page at 808.

At 810, the networking system 300 may enter a cycle of updating ranks of posed questions/tasks. Such updating may be necessary to ensure that the tasks, as displayed on the web site 310, may reflect accurate rankings based on updated bid values from common users 415. Updating may be implemented, preferably behind the scenes and out of view of the users 415 and 435, by providing a question selector on the client computer 102 to iterate through questions and tasks in the local tasks queue 420. Each web client 124 may provide metadata to the server assembly 230 describing changes to bid values and task ranks. At each iteration, at 810, a web client 124 may determine whether the question selector references an asked question/task. If so, at 812, an updated rank of the question or task may be retrieved from the tasks queue 420 on the server assembly 230. The rank of the question or task referenced by the question selector may then be updated on the web client 124 to reflect current bid values at 814.

Figure 9:
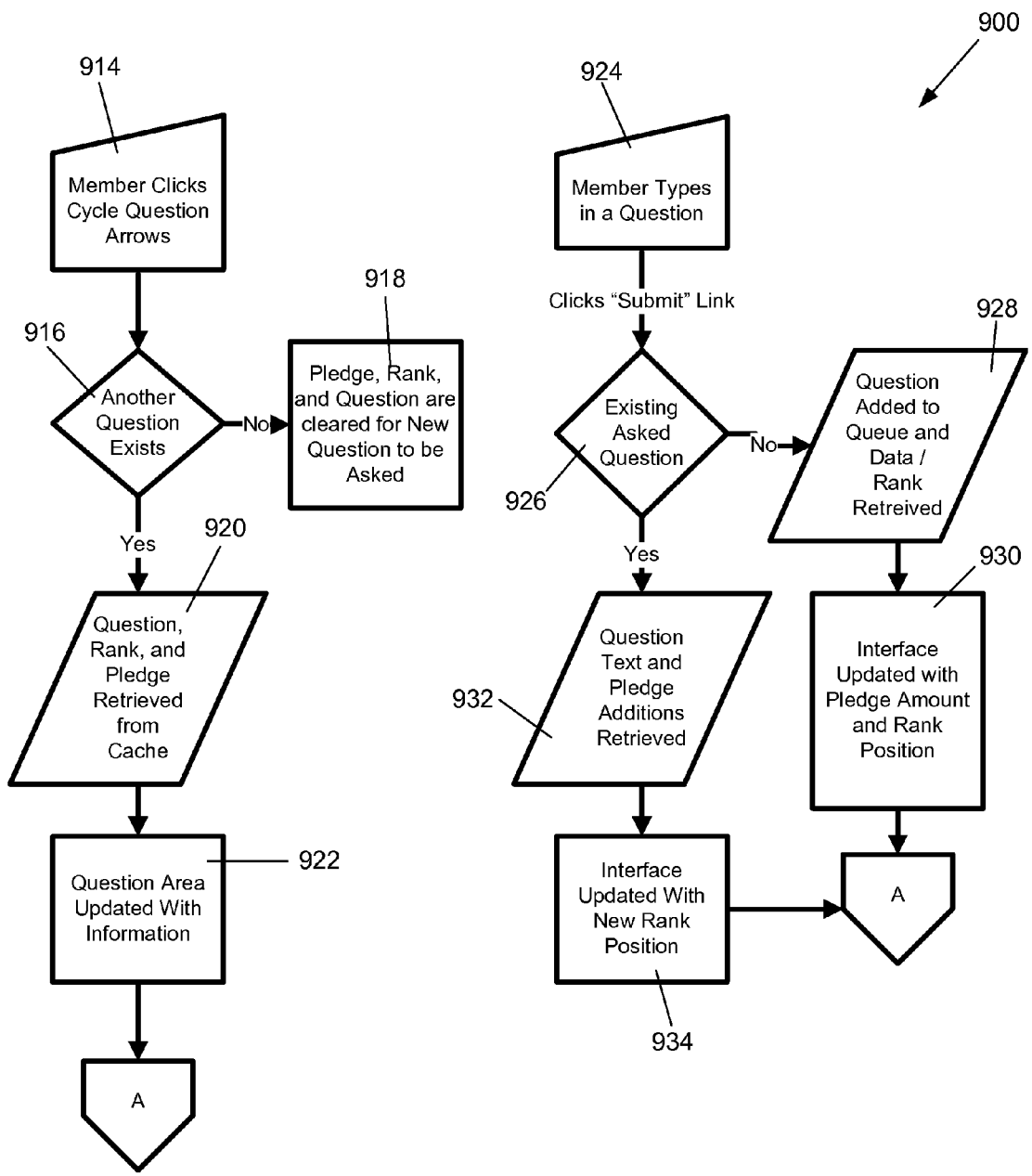
FIG. 9 illustrates a flow diagram of a process of the user participating in the chat bidding session of the chat bidding system, according to an exemplary embodiment of the present invention.

FIG. 9 illustrates an exemplary process 900 of a common user 415 participating in an exemplary chat bidding session. At 915, the common user 415 may use arrows, or similar selectors, to cycle through tasks and questions previously posed by that particular common user 415. At 916, the networking system 300 may determine whether questions or tasks posed by other common users 415 exist in the queue 420. If no such other questions or tasks exist, the networking system 300 may clear areas of the cache used for displaying tasks and their pledges and ranks. The common user 415 may then pose new questions or tasks to the featured user 435. Alternatively, if one or more questions or tasks remain in the tasks queue 420, as at 920, data regarding such tasks may be retrieved from the cache and then displayed at 922. Then, when the common user 415 enters a question or task at 924, the networking system 300 may insert such question or task into the tasks queue 420. If the newly posed question or task has not been previously posed in the chat bidding session, the web page of the chat bidding session may then be updated with data regarding the newly posed question or task of the common user 415. Otherwise, if the question or task was previously posed, the task and related data, such as an associated bid value, may be retrieved from the cache at 932, and then displayed on the web page of the chat bidding session at 934.

Preferably, the client computer 102, such as that used by the common users 415 or the featured user 435, and the server assembly 230 interact in the chat bidding session through a service executing a dynamic update. This service may enable the web page of the chat bidding session to update without user interactions, such as clicking a "Refresh" button on the web client 124. The dynamic update service may enable the common user 415 to view real-time positions of his tasks in the queue 420, as well as real-time data for various other statistics viewable to the common user 415. The dynamic update service may enable the featured user 435 to view real-time data related to, without limitation, any or all of the following: number of tasks in the tasks queue 420, number of queued tasks associated with bids, elapsed time of the chat bidding session, estimated time to respond to all queued tasks, average time to respond to each task, amount of money raised, number of common users 415 viewing the chat bidding session, and various other statistical data related to the chat bidding session Performance Bidding System Through the performance bidding system 340, users may request to perform on the web site 310, and may pledge credits to determine an order in which they may be allowed to perform. Such pledged credits may be directed towards a benefiting charity or may be paid to the web site 310 for the opportunity to perform. Alternatively, credits may be divided between the web site 310 and the benefiting charity. In some exemplary embodiments, the benefiting charity, if any, may be predetermined, and the users may be notified of information regarding the charity.

The performance bidding system 340 may be available to both common users 415 and featured users 435. For convenience, members of all classes of users may be referred to as "users." Through the performance bidding system 340, common users 415 may have an opportunity to perform for featured users 435 and other common users 415. Similarly, featured users 435 may have an opportunity to perform for common users 415 and other featured users 435. Users participating in the performance bidding system 340, but not currently queued for a performance on the web site 310, are herein referred to as observers. The users queued for performances are herein referred to as performers. Together, performers and observers make up the participants of the performance bidding system 340.

The performance bidding system 340 of the web site 310 performs in some manners similar to the chat bidding session. Similarly to the chat bidding system 330, the performance bidding system 340 may comprise a queue, specifically a performance queue, and a plurality of participating users.

When a performance request reaches the top of a performance queue, the user making the performance request may perform live for other participants. During a performance, the networking system 300 may provide the performing user with music and lyrics, as in a karaoke style performance. If a non-karaoke type of performance is desired, the web site 310 may provide other, appropriate support for the performance. For example, if the performing user indicates that she would like to perform in spoken work, the web site 310 may provide soft background music as indicated by the performing user. The performing user may provide one or more recording devices, such as a webcam and a microphone, and the server assembly 230 may receive media representing the performance. Preferably, such media is streaming media. The web site 310 may present the performance, preferably streaming, to the observers.

Users who make performance requests may be provided with a menu of selections for supporting their performance. For example, a user requesting to perform karaoke-style may be presented with a list of songs for the web site 310 to provide music and lyrics. Upon selecting specific performance support for a performance, the user's username and support selections, such as a song title, may appear in a status section of a web page of the performance bidding system 340 to identify the user's position in the performance queue. All other queued performers, or alternatively, a predetermined number of highest ranked performers in the performance queue, may also appear in the status section, thereby providing participants with data regarding expected performances.

Through the performance bidding system 340, the web site 310 may display data regarding the performers, observers, or all participants. For example, and not limitation, the web site 310 may display the total numbers of performers and observers. The web site 310 may also display statistics of performers or of the total participating users, such as displaying geographic statistics of the performers or of all participants. This may give participants an estimate of the geographic range of the performers, and may give performers a geographic range of the observers.

Upon making a performance request, a user may pledge credits to the request and, thereby, associate the request with a bid value. If no bid value is provided with a performance request, the request may be placed at the bottom of the performance queue. However, a performer may increase her position in the queue by increasing her pledge value above other another performer's pledge value. Performers may rise in the performance queue as others perform and are, consequently removed from the queue. A performer's position in the queue may be dynamic, as all performers may increase their bid values to escalate their own positions in the performance queue. Therefore, a performer's queue position may periodically change and be updated accordingly in the status section.

A bidding dialog box on the web site 310 may provide performers with means to increase their pledges and, thereby, potentially increase their positions in the performance queue. The bidding dialog box may display to each performer an amount of credits required to increase the performer's queue position to a certain rank in the performance queue. After a performer attains one of the top X positions in the performance queue, the performer's position may become locked. Locking the top X positions in the performance queue may be implemented in various manners, including those described above with reference to the top N positions of the tasks queue 420. Performers with the top X locked positions may be able to perform in succession regardless of pledge increases of participants. At a point in time, the top X performers, along with their support selections, may be displayed in the status section of the web page of the performance bidding system 340.

While a user is performing on the web site 310, data from her profile may be displayed to participants of the performance bidding system 340. Participants may also have an opportunity to follow a web hyperlink and, thereby, view the performing user's full profile on the web site 310. Participants may then be able to learn more about the performing user and may leave feedback on the performing user's profile.

At the end of each performance, a rating window may automatically be presented to the participants. Through the rating window, the participants may rate the performance or leave feedback regarding the performance. Top-rated performances may be stored on the server assembly 230 and accessible for replay by each participant.

Figure 10:
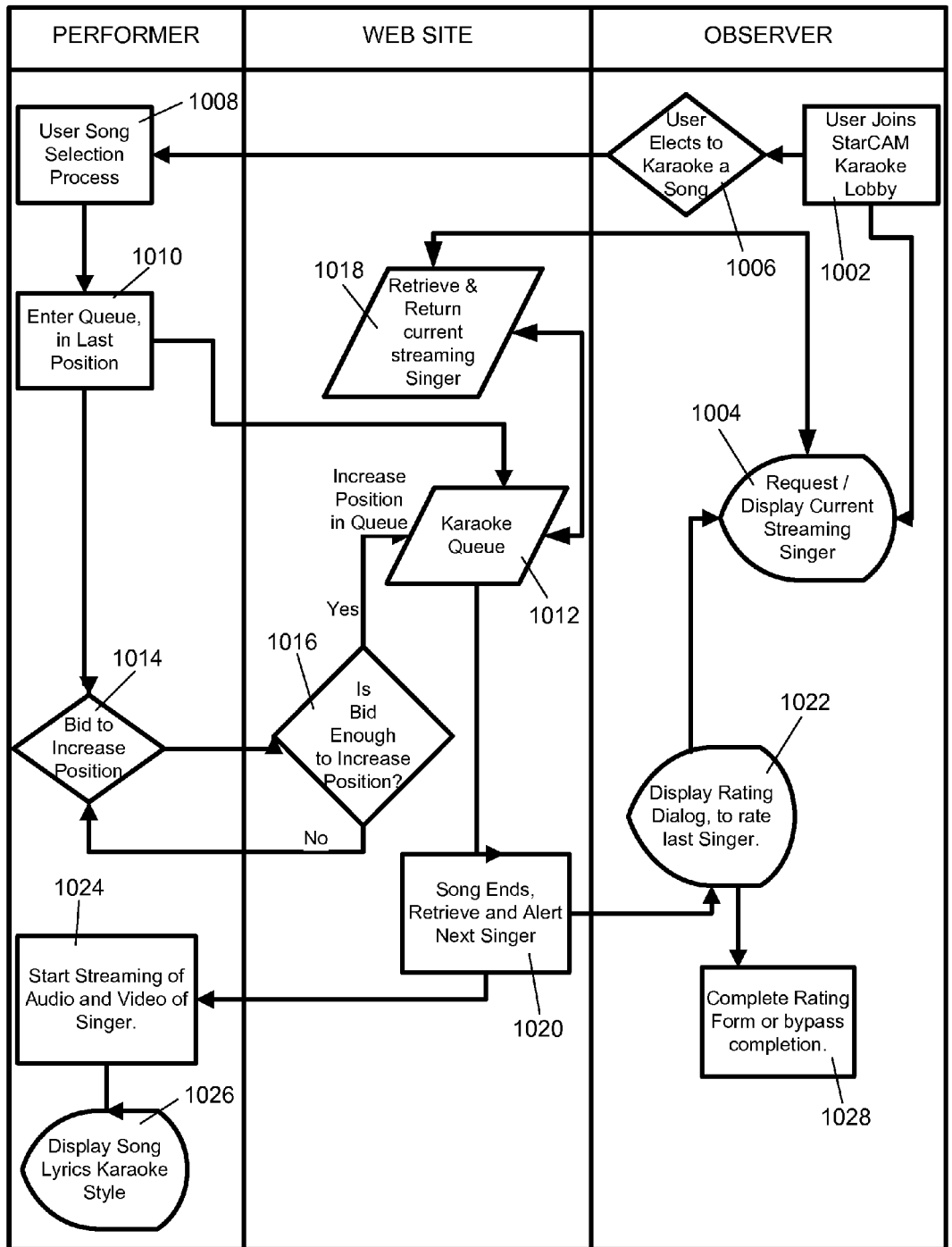
FIG. 10 illustrates a flow diagram of an operation of a performance bidding system of the networking system, according to an exemplary embodiment of the present invention.

FIG. 10 illustrates a flow diagram of an operation 1000 of the performance bidding system 340, according to an exemplary embodiment of the networking system 300. As shown in FIG. 10, at 1002, a participant may enter a lobby, or introductory web page, of the performance bidding system 340 of the web site 310. The participant may participate passively by requesting, receiving, and viewing streaming media of the current performing user at 1004. The participant may elect to become a performer at 1006. At 1008, the participant may be presented with a selection of support material, such as a list of songs from which the participant may select a song to perform karaoke-style. After the participant selects support material, the user's username and support material may be inserted into the last position of the performance queue, at 1010, if no credits are yet pledged. The performance queue may be maintained and dynamically updated at 1012. At 1014, the participant may be offered an option to pledge credits, or additional credits, to escalate her position in the performance queue. If the participant bids credits to escalate her position, at 1016, the networking system 300 may determine whether the bid is sufficient to raise the participant's position in the performance queue. If the bid is sufficient, the process 1000 returns to 1012 and updates the performance queue.

When a performance ends at 1020, a next performer in the performance queue may be alerted. Additionally, the queue may be updated, and a rating dialog box may be displayed at 1022, providing participants an opportunity to rate the previous performer and to provide comments about the performance. Accordingly, participants, including the previous performer, may be provided with instant feedback from other participants. Viewing participants may complete a rating form in the dialog box or may bypass completing the rating form at 1028.

When a participant performs, streaming media, such as audio and video, of the performer may be presented to all viewing participants at 1024. If the participant is performing karaoke-style, the participant may be provided with background music and lyrics at 1026.

Accordingly, users of the networking system 300 may interact with one another by performing for one another, viewing such performances, and communicating regarding such performances.

Telephony Switching System

In accordance with an exemplary embodiment of the telephony switching system 350, parties may contact one another anonymously. The telephony switching system 350 may enable a party to limit calls from certain users and groups of users, and according to predefined schedules. This feature of the web site 310 may be especially beneficial for featured users 435. Through the telephony switching system 350, a featured user 435 may place or accept a call to or from a common user 415 while maintaining a concealed phone number. Additionally, through predefined scheduling rules, the featured user 435 may block all calls during certain time periods. Furthermore, common users 415 may transition a chat session to a telephone call without compromising the privacy common to chat sessions.

In an exemplary embodiment of the networking system 300, a calling party may request a connection, such as a telephone chat, to a receiving party. Prior to attempting to forge the connection, the networking system 300 may verify that the receiving party is willing to accept the connection from the calling party. Once verified, the networking system 300 may place a call to each of the calling party and the receiving party, and may then patch the two calls together so that each of the two parties can engage in a chat without divulging contact information, such as a telephone number, to the other party. Alternatively, the calling party may initialize the connection by contacting a service center and requesting to be connected to the receiving party via a communication device. In such an embodiment, the service center may initiate a call to the receiving party and patch that call to the calling party.

Figure 11A:
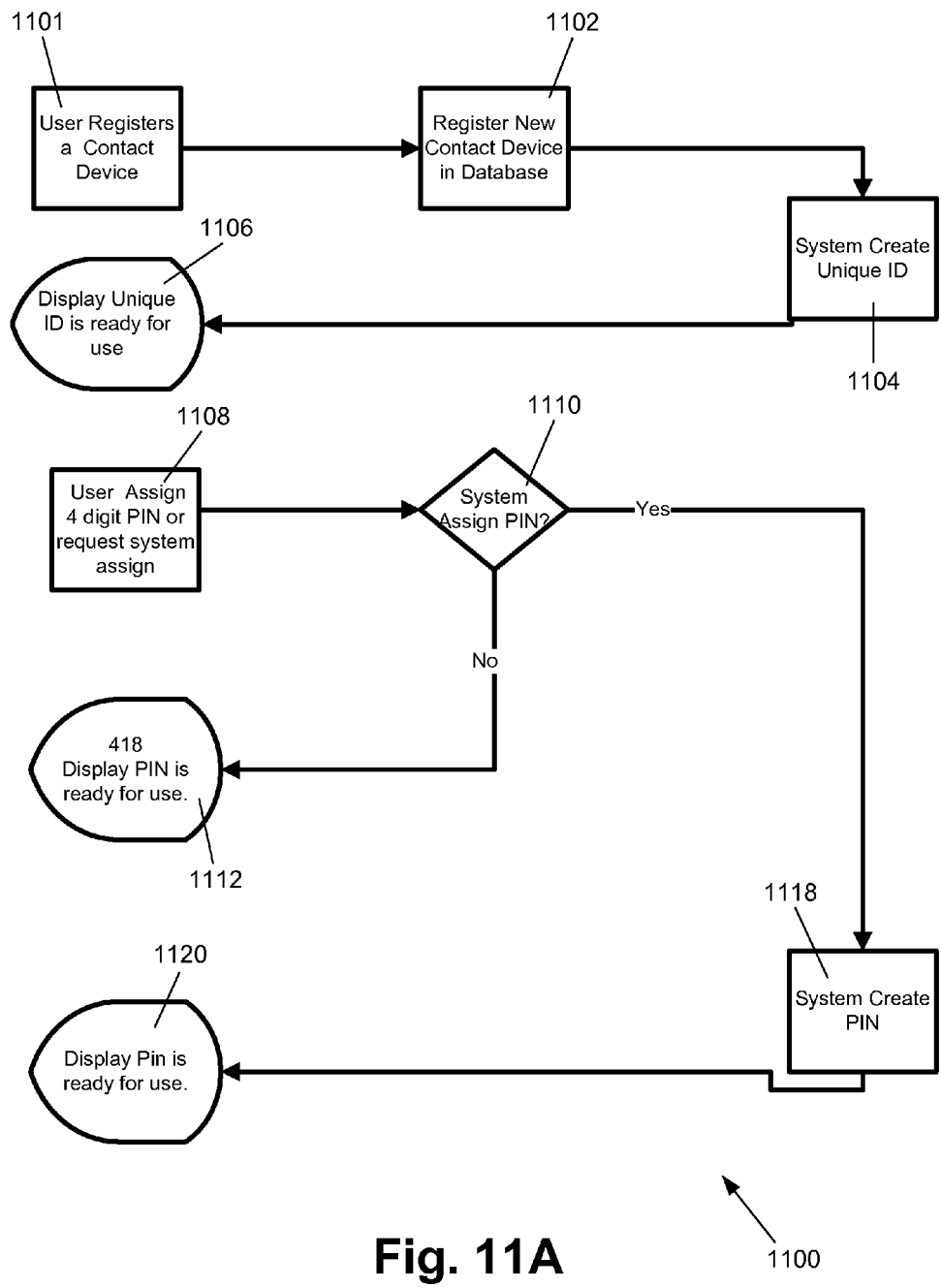
FIG. 11A illustrates a process of registering a communication device with the telephony switching system of the networking system, according to an exemplary embodiment of the present invention.

Before a user may utilize the telephony switching system 350, a communication device of the user may need to be registered with the telephony switching system 350. FIG. 11A illustrates a process 1100 of registering a communication device with the telephony switching system 350. As shown in FIG. 11A, at 1101, the user of the telephony switching system 350 may request that the communication device be registered. At 1102, the telephony switching system 350 may register the communication device on a database of the server assembly 230. At 1104, the telephony switching system 350 may create a unique identifier associated with the communication device. At 1106, a message may be displayed on the web site 310 notifying the user of the unique identifier and its availability for use. At 1108, the user may either assign his own personal identification number ("PIN") or request that the telephony switching system 350 create a PIN for the user. At 1110, telephony switching system 350 may determine whether the system 350 is to create a PIN or, alternately, whether the user has submitted a PIN for validation. If the telephony switching system 350 was asked to assign a PIN, such a PIN is created and assigned by the telephony switching system 350 at 418. Otherwise, the user assigned PIN may be validated. At 412 and 420, the web site 310 may display that the PIN is active and ready for use.

Accordingly, after completing the registration process, the communication device may be associated with a unique identifier and a PIN. Generally, the unique identifier may be used to identify a calling party when a connection is requested via the telephony switching system 350. The PIN, on the other hand, may be used to identify a receiving party. In other words, when attempting a connection, the calling party may provide a unique identifier to identify himself, and may provide a PIN to identify the receiving party. Accordingly, the calling party may be required to receive a PIN from the receiving party before connecting to the receiving party. Each receiving party may request and receive multiple PINs from the telephony switching system 350. According to wishes of the receiving party, each PIN may serve a distinct purpose. For example, a first PIN may be distributed to family members for contacting the receiving party, and a second PIN may be distributed to business associates for contacting the receiving party. This will be described in further detail below.

Figure 11B:
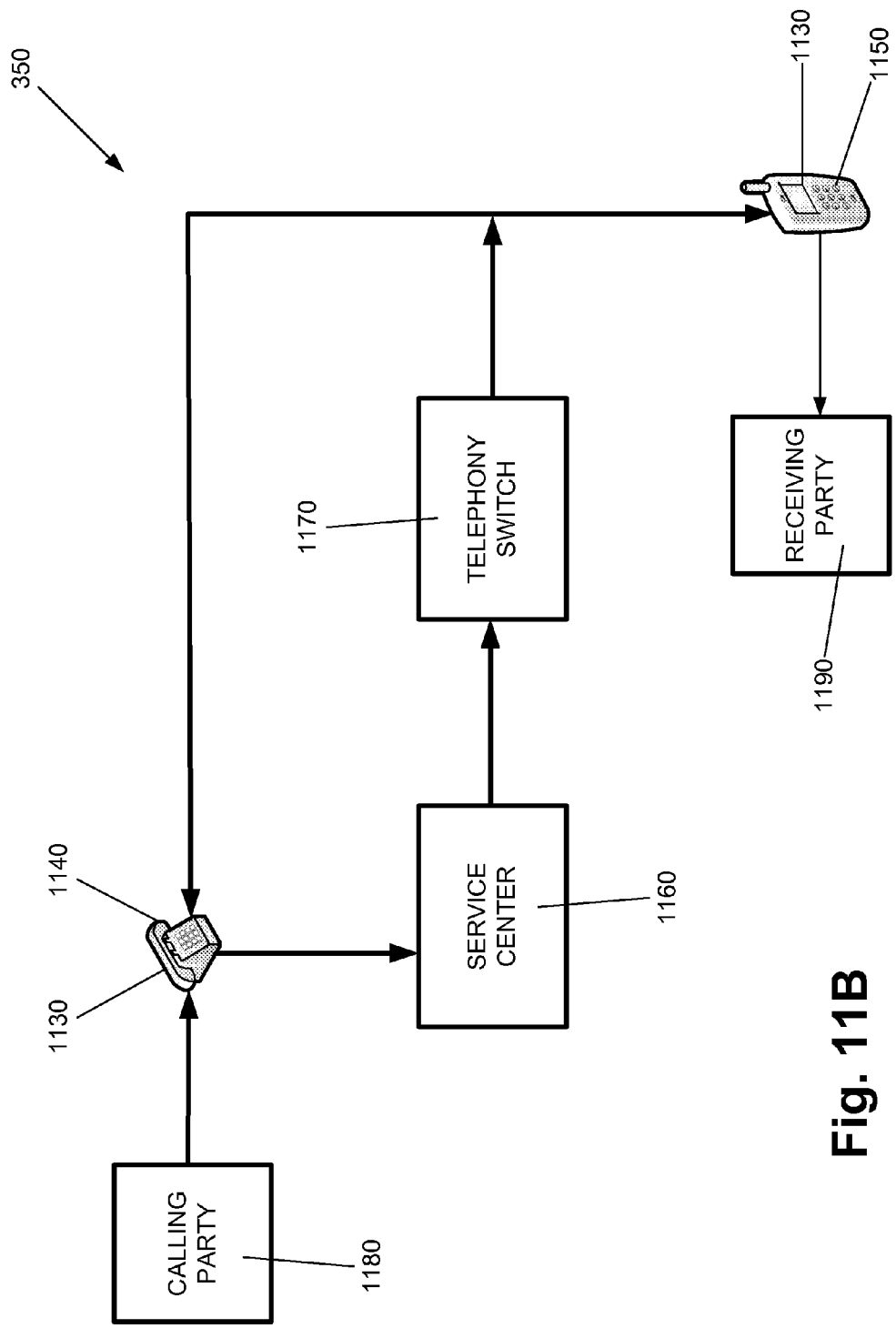
FIGS. 11B-11C illustrate block diagrams of a telephony switching system of the networking system, according to an exemplary embodiment of the present invention.
Figure 11C:
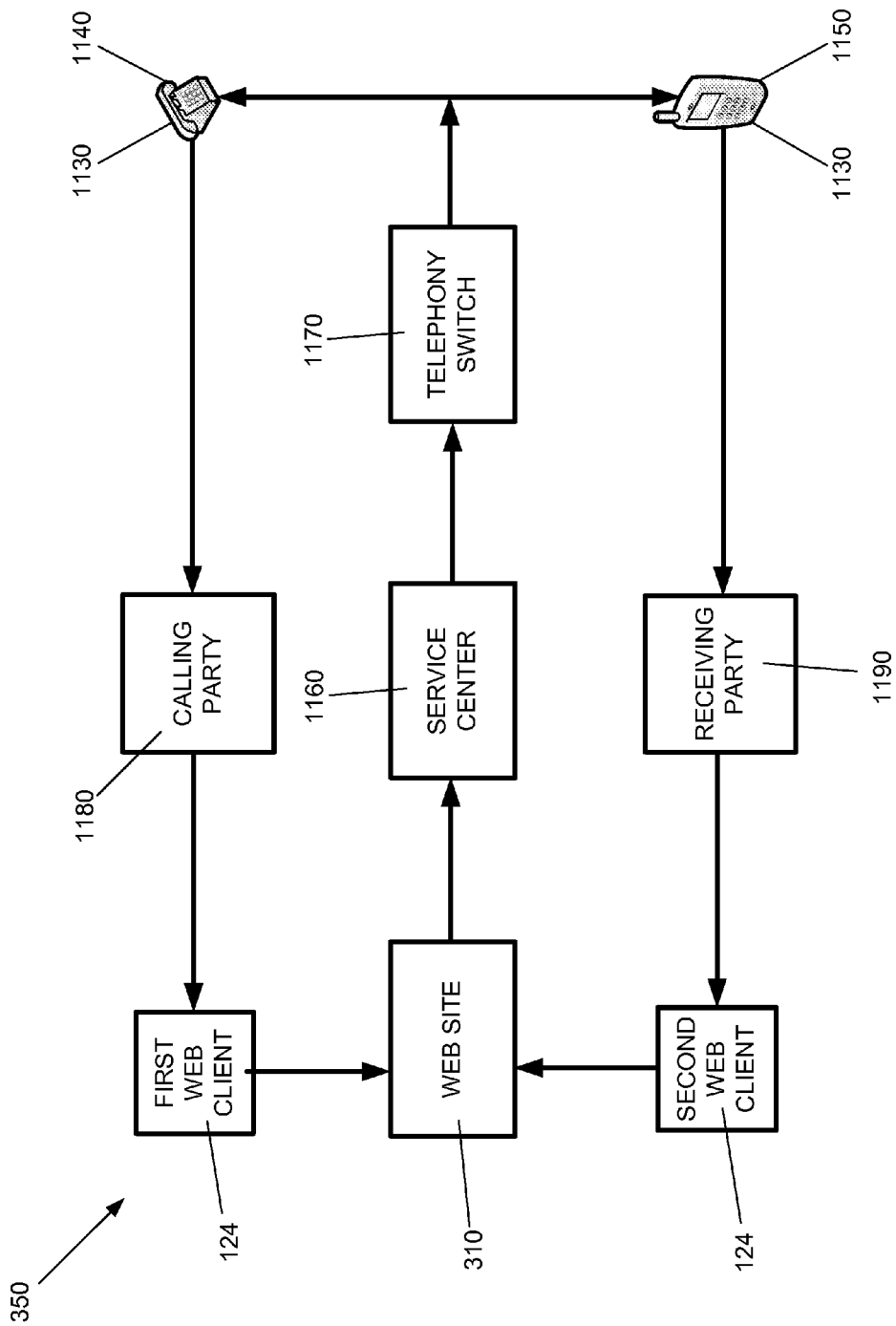

FIGS. 11B-11C illustrate block diagrams of exemplary embodiments of the telephony switching system 350. As shown in FIG. 11B, an exemplary embodiment of the telephony switching system 350 may generally comprise at least two communication devices 1130, a service center 1160, and a telephony switch 1170.

As shown in FIG. 11B, the calling party 1180 may use the first communication device 1140 to communicate with the service center 1160. The service center 1160 may be in communication with the telephony switch 1170. The telephony switch 1170 may be in communication with the first communication device 1140 and the second communication device 1150, and may connect the first communication device 1140 to the second communication device 1150. For purposes of FIGS. 11B-11C, the communication devices 1130 are already registered with the telephony switching system 350.

The communication devices 1130 may include a first communication device 1140 and a second communication device 1150. For purposes of an exemplary embodiment of the telephony switching system 350, communication devices 1130 may comprise various devices capable of communicating over a communications network, such as a telephone network or the internet. Each communication device 1130 may be a wired telephone, wireless telephone, cellular telephone, satellite telephone, voice over IP ("VoIP") phone, PDA, soft phone, computer, or other device capable of audio and/or video communications. The first communication device 1140 may be associated with a first phone number and a calling party 1180. The first phone number identifies the first communication device 1140. Similarly, the second communication device 1150 is associated with a second phone number and a receiving party 1190. The second phone number identifies the second communication device 1150.

The service center 1160 may comprise one or more hardware or software devices, or various combinations thereof, capable of receiving and storing registrations relating to communication devices 1130, managing such registrations, analyzing connection requests relating to registered communication devices 1130, and initiating and managing connections.

The telephony switch 1170 may comprise various telephone exchanges, switches, or combinations thereof. For example, and not limitation, the telephony switch 1170 may be a private branch exchange ("PBX"). The telephony switch 1170 may connect the calling party 1180 to the receiving party 1190 if such a connection is deemed allowed.

In an exemplary embodiment of the telephony switching system 350, the telephony switch 1170 may comprise one or more PBX switches trunked to other telephony switches and telephony service centers with various PBXs located around the world. Trunks may allow multiple calls to be combined into a single channel and be delivered to other PBXs either in the same telephony switch 1170 or other telephony switches having available channels to VoIP termination providers or public switched telephone network ("PSTN") terminations. In addition, the telephony switch 1170 may provide trunks and termination end points to provide high quality and low cost termination to communication devices 1130. The termination end points and trunks may also be provided through a third party VoIP termination or PSTN. In an exemplary embodiment, the PBX implementation may be a software system allowing existing telephony infrastructure to interact using VoIP standards.

In some exemplary embodiments of the telephony switching system 350, the service center 1160 and the telephony switch 1170 may be integrated together. For example, the service center 1160 may comprise a PBX for providing the call-handling for users requesting communications with other users. Calls may traverse digital circuits, analog interfaces, VoIP networks, or various other networks for delivering communications. Digital circuits may be defined telephony standards, such as T1 lines carrying 24 channels of voice to standard telephony companies. Analog interfaces may provide single channels of voice for delivery to the public switched telephone network (PSTN). VoIP protocols, such as SIP, IAX, H.323, and others, may enable audio, metadata, and video to be digitized, secured, and compressed for delivery over computer networks to other service centers or other termination endpoints. These delivery mediums may enable the PBX in the service center 1160 to connect two or more parties anonymously.

Figure 12:
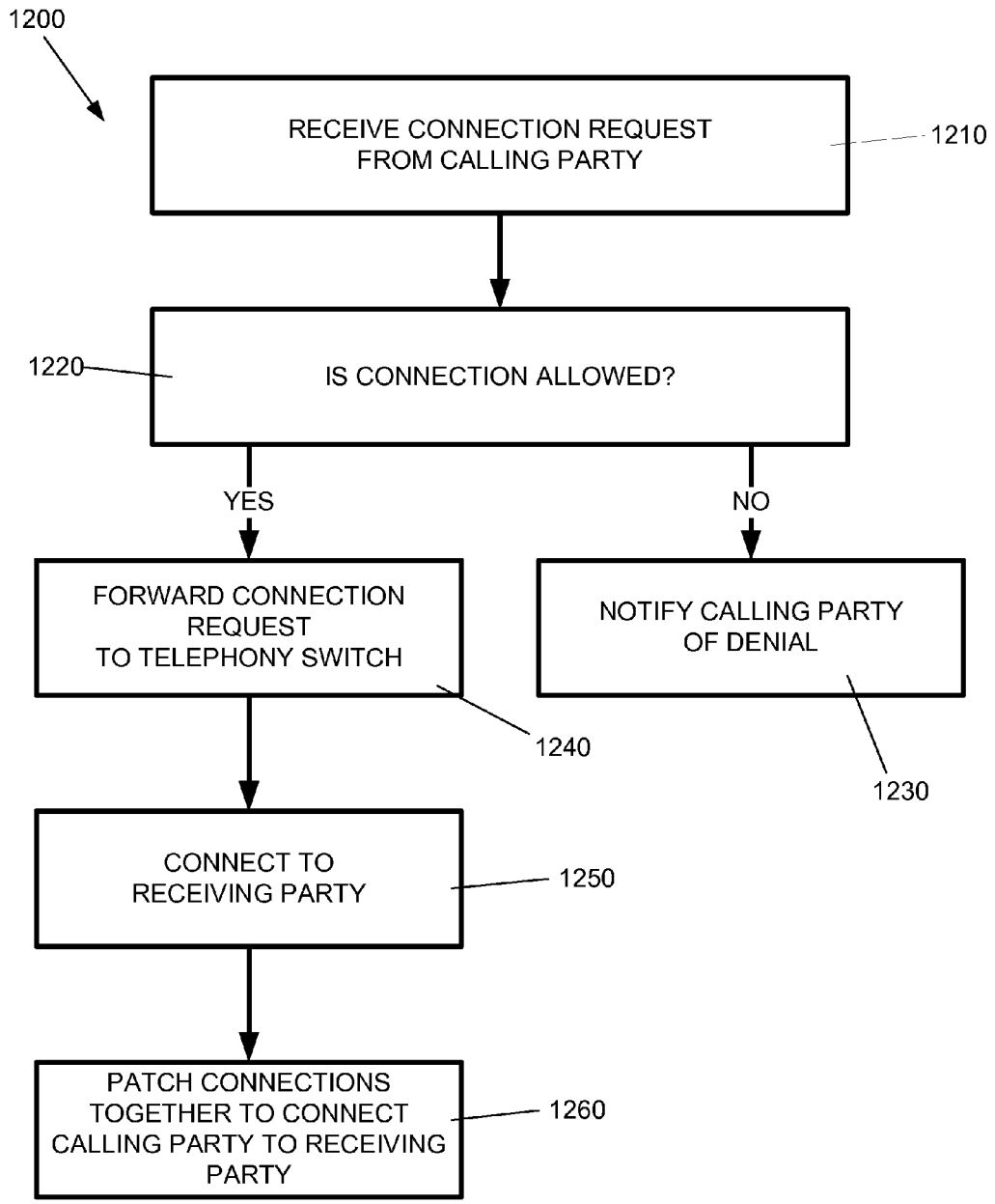
FIG. 12 illustrates a flow diagram of a method of handling a connection request from a calling party to a receiving party in the telephony switching system of the networking system, according to an exemplary embodiment of the present invention.

FIG. 12 is a flow diagram illustrating a method 1200 of handling a connection request from the calling party 1180 to connect to the receiving party 1190, according to an exemplary embodiment of the telephony switching system 350. At 1210, the service center 1160 receives a connection request from the calling party 1180 to connect to the receiving party 1190. Such communication request may be made by the calling party 1180 through the first communication device 1140. Alternatively, the communication request may be made by the calling party 1180 via a web interface. At 1220, the service center 1160 may determine whether a connection is allowed given predetermined variables. Such variables may include certain contact rules preset by the receiving party 1190. For example, and not limitation, each user may provide a list of users permitted to call, a list of users not permitted to call, times when calls are allowed, or other suitable calling criteria. If the connection request is not allowed, the service center 1160 may notify the calling party 1180 of the denial, as at 1230. Otherwise, if the connection request is approved, at 1240, the service center 1160 may forward the connection request to the telephony switch 1170. At 1250, the telephony switch 1170 may connect to the second communication device 1150 and, therefore, to the receiving party 1190 using the second communication device 1150. Finally, at 1260, the telephony switch 1170 may patch together its connections to the calling party 1180 and the receiving party 1190, such that the two parties 1180 and 1190 are in communication with each other. If the receiving party 1170 does not answer, the calling party 1160 may be permitted to leave a voice message within the receiving party's video/voice mailbox.

Referring now back to FIG. 11B, communication devices 1130, such as the first and second communication devices 1140 and 1150, may be registered with the service center 1160. Registrations may be communicated to the service center 1160 through various manners. For example, and not limitation, registration of the first communication device 1140 may be communicated to the service center 1160 through a phone call, such as by the calling party 1180 calling the service center 1160 and providing registration information.

Alternatively, registration may be accepted through a web client 124. The web client 124 may receive registration information and send it to the server assembly 230. The server assembly 230 may be part of, or in communication with, the service center 1160. Alternatively, the service center 1160 may be part of the server assembly 230. The server assembly 230 may provide the registration information to the service center 1160. Registration information for a communication device 1130 may include, without limitation, a phone number associated with the communication device 1130, an account identifier, and a set of contact rules.

The account identifier may comprise information for identifying a user account on the web site 310. The specified user account may then be associated with the communication device 1130. As discussed above, an account user, such as the calling party 1180, may have a credit account associated with the user account. The credit account may track a number of credits available to the associated user for purchasing services from the web site 310. By associating the user account with the communication device 1130, credits available to the user of the user account may also become available for the purpose of purchasing connections through the telephony switching system 350. Additionally, credits may be charged for the duration of connections initiated through the telephony switching system 350.

As a part of a registration, the set of contact rules may indicate who may connect to the communication device 1130, and when such connections may occur. Various rule types may be included in the contact rules. For example, and not limitation, the contact rules for the receiving party 1190 or the second communication device 1150 may specify that connections may be made from the first communication device 1140 only during certain hours. For purposes of establishing contact rules, the receiving party 1190 may refer to the first communication device 1140 by, for example, its associated phone number, its unique identifier, or a username or other alias of the receiving party 1190. For additional example, the contact rules may specify that users of a predefined group may not connect to the second communication device 1150, or that users of the predefined group may connect to the second communication device 1150 only during specified hours. The contact rules may specify that the first communication device 1140, or users of the predefined group, may never connect to the second communication device 1150 or, alternatively, may connect to the second communication device 1150 at any time. The contact rules may also specify categories of allowed or disallowed calls, such as conference calls, faxes, or calls from cellular telephones. One skilled in the art will recognize that the contact rules may specify alternate handling of connection requests based on various factors, including, without limitation, subject matter of the call, gender of the calling party, geographic location of the calling party, and/or time of the call.

At least partially because of the wide range of potential contact rules, embodiments of the telephony switching system 350 may have wide application. For example, the telephony switching system 350 may be used for recruiting and screening employment opportunities. A potential hiree may structure contact rules around acceptable employment opportunities. For further example, the potential hiree may allow calls only from recruiters or employers having job opportunities in a predefined geographic area, with salaries over a predetermined threshold, and/or with a predetermined set of benefits.

The contact rules may specify actions to be taken if a connection is requested when the receiving party 1190 is unavailable and cannot, therefore, respond to a connection made through the telephony switching system 350. For example, and not limitation, the contact rules may specify which parties are approved to leave messages, and which parties are to be presented with a pre-recorded message from the receiving party 1190. Further, the contact rules may specify alternate voicemail recordings to be presented to alternate calling parties 1180. A connection may be automatically terminated if the calling party 1180 is not approved to leave a message or to receive a pre-recorded message when the receiving party 1190 is unavailable. Additionally, if a call is attempted, but the receiving party 1190 does not answer the call, the system 350 may terminate the call when the system 350 detects that the receiving party's voicemail is answering the call. Such termination may be useful in maintaining the privacy of the receiving party 1190 because personal information, such as the person's identity or phone number, may be present on the standard voicemail greeting. In such cases, the calling party 1180 may be diverted to the receiving party's mailbox associated with the system 350, or the call may be terminated without allowing a message to be left.

Mailboxes on the system 350 may receive messages of various types. For example, and not limitation, such mailboxes may include conventional voice mailboxes, video mailboxes, audio mailboxes, email mailboxes, and multimedia mailboxes capable of receiving various types of mail. When a call to the receiving party 1190 is unanswered, the calling party 1180 may be redirected to a voice mailbox, or may receive instructions for leaving a message in some other media format. Through the web site 310 or over a phone call, the receiving party 1190 may have various options for organizing, sorting, retrieving, and responding to messages, including those messages left through the telephony switching system 350. For example, the receiving party 1190 may sort messages based on characteristics of senders of the messages, or on other characteristics of the messages. The receiving party 1190 may respond individually or en masse to all messages or a set of messages. Such response may also take various media formats, such as video, audio, email, or multimedia.

In addition to the above, the contact rules may specify that any person who provides a specific PIN may connect to the second communication device 1150 according to a predefined schedule associated with the caller PIN. As described above, the receiving party may have multiple PINs for distinct purposes. Multiple caller PINs may be assigned and used for various users, groups, or call types. For example, different caller PINs may be provided for chat sessions, for a family group, and for a celebrity fan group. Each caller PIN may be automatically generated by the service center 1160, or the receiving party 1190 may create the caller PIN and provide such caller PIN to the service center 1160. Each caller PIN may, for example, allow unlimited uses, a specific number of uses, or may be given an absolute or relative termination date.

Connections may be requested in various ways. For example, the calling party 1180 may call the service center 1160, which is preferably identified by a toll free number. When connected to the service center 1160, the calling party 1180 may provide information to identify the receiving party 1190. For example, and not limitation, the calling party 1180 may enter a username for a user account of the receiving party 1190, an identifying PIN associated with the receiving party 1190, the unique identifier of the receiving party 1190, or various other identifiers or aliases of the receiving party 1190. Preferably, the service center 1160 receives such information from the calling party 1180 via an automated service provided by the service center 1160.

If the receiving party's contact rules dictate that the calling party 1180 provide a caller PIN, the calling party 1180 may be prompted to provide such a caller PIN. In a first exemplary embodiment, the service center 1160 may automatically recall the unique identifier of the first communication device 1140. In an alternate exemplary embodiment, the service center 1160 may prompt the calling party 1180 to enter the unique identifier of the first communication device 1140. The service center 1160 may consider this unique identifier when determining whether to approve the connection. After receiving the connection request, the service center 1160 may approve or deny the connection based on data received from the calling party 1180 and the first communication device 1140, as compared to the contact rules of the receiving party 1190.

As illustrated in FIG. 11C, and as briefly discussed above, the connection request may also be made over the internet through use of one or more web clients 124. Through a first web client 124, the calling party 1180 may be logged into a user account on the web site 310. Through links in the web site 310, the calling party 1180 may request a connection to the receiving party 1190. The calling party 1180 may not be required to know the name or phone number of the receiving party 1190, so long as the calling party 1180 can provide predetermined identifying information regarding the receiving party 1190. For example, and not limitation, the calling party 1180 may provide or select a username of a user account associated with the receiving party 1190. The server assembly 230 may receive the connection request and may route the request to the service center 1160 for approval. The service center 1160 may approve or deny the connection based on contact rules of the receiving party 1190.

Alternatively, the receiving party 1190 may be logged onto the web site 310 when the calling party 1180 requests a connection to the receiving party 1190. In that case, the receiving party 1190 may be notified of the connection request via a second web client 124 used by the receiving party 1190. Via the second web client 124, the receiving party 1190 may approve or deny the connection request. The receiving party's approval or denial may be received by the server assembly 230. If the receiving party 1190 approves or denies the connection request via the second web client 124, the service center 1160 need not determine whether to connect the calling party 1180 to the receiving party 1190. If the receiving party 1190 approves the connection, the server assembly 230 may notify the telephony switch 1170 of such approval. The telephony switch 1170 may then connect the calling party 1180 to the receiving party 1190, as described further below.

The service center 1160 may receive connection requests from the server assembly 230 or from the calling party 1180. In response to such receipt, the service center 1160 may determine whether to honor connection requests. After receiving the connection request of the calling party 1180, the service center 1160 may query the contact rules of the receiving party 1190 to determine whether the calling party 1180 may connect to the receiving party 1190. If the contact rules specify that the calling party 1180 or the first communication device 1140 may connect to the receiving party 1990 or the second communication device 1150 at the time the connection request is made, then the service center 1160 may approve the connection request. Otherwise, the service center 1160 may deny the connection request. If the receiving party 1190 is logged into the website and approves the connection, the contact rules verification step may be skipped.

If a connection request is denied, the calling party 1180 may be disconnected from the service center 1160 without being connected to the receiving party 1190. Preferably, such a disconnection is preceded by the service center's providing a polite message to the calling party 1180 notifying the calling party 1180 that the requested connection is not allowed. If the connection request was made via the first web client 124, then the server assembly 230 may prompt the first web client 124 to notify the calling party 1180 of the denial.

If, on the other hand, the connection request is approved, the service center 1160 may communicate the approved connection request to the telephony switch 1170. The telephony switch 1170 may then connect the calling party 1180 to the receiving party 1190. For example, and not limitation, the telephony switch 1170 may direct a signal to the second communication device 1150 indicating that a connection is requested. Such a signal may result in the second communication device 1150 issuing an alert, such as an audible tone, to notify the receiving party 1190 that a call is waiting. Caller identification data associated with the service center 1160 may also be transmitted to the second communication device 1150. Accordingly, if the second communication device 1150 is capable of displaying caller identification data, it may display data related to the service center 1160. If the second communication device 1150 is activated after receiving the signal, such as by the receiving party 1190 answering a phone call, the telephony switch 1170 may connect the first communication device 1140 to the second communication 1150 device. Upon activation of the second communication device 1150, the telephony switch 1170 may immediately connect the first and second communication devices 1140 and 1150. Alternatively, the service center 1160 or the telephony switch 1170 may prompt the receiving party 1190 to accept the connection. Then, the call may be connected only if the receiving party 1190 accepts the connection.

If an approved connection request was received via the first web client 124, then the telephony switch 1170 may send signals to both the first communication device 1140 and the second communication device 1150. Caller identification data associated with the service center 1160 may be transmitted to the first and second communication devices 1140 and 1150. Accordingly, if the communication devices 1140 and 1150 are capable of displaying caller identification data, they may display data related to the service center 1160. In response to such signals, the communication devices 1140 and 1150 may issue alerts to the calling and receiving parties 1180 and 1190 of the connection. When the calling and receiving parties 1180 and 1190 activate the first and second communication devices 1140 and 1150, the two parties 1180 and 1190 may be connected.

In an exemplary embodiment of the telephony switching system 350, the caller identification information may include data relating to the service center 1160, such as a phone number of the service center 1160. In an alternative embodiment, calls may be associated with alternative caller identification information. For example, and not limitation, the caller identification information may include an alias, username, or handle of the other party and/or a telephone number associated with the web site 310 or service center 1160.

In an exemplary embodiment of the telephony switching system 350, at least one of the calling party 1180 and the receiving party 1190 may be required to use credits to purchase the connection request, the approved connection, or both. Additionally, call crediting may be required for each unit or other measurement unit of call time. Credits may be automatically debited from applicable accounts when a connection is requested or when a call is connected.

The cost, in credits, of connection requests and connections may vary based on predetermined variables. For example, connection to a fax machine may require more credits than connection to a landline telephone. A connection during a business day may require more credits than a connection on an evening or weekend. When the calling party 1180 requests a connection to the receiving party 1190, the calling party's credit account may be debited for the request. If the receiving party 1190 accepts the connection, through contact rules or through an affirmative approval, credit accounts of both parties 1180 and 1190 may be debited for the connection. Alternatively, a debit may only be required for approved connections instead of for connection requests as well, or a debit may only be required for the calling party 1180. Additionally, in some exemplary embodiments of the telephony switching system 350, a debit may only be required from the calling party 1180 when a common user 415 connects to, or requests a connection to, a feature user 435.

Media Interaction System

The networking system 300 may further comprise a media interaction system 360 accessible through the web site 310. The media interaction system 360 may enable a first user to interact with a second user through a use of one or more media objects.

Media objects may allow users a creative and personal means to interact with other users. Media objects may comprise various types of media, such as computer animations, other video, audio, or text. Preferably, a media object may comprise an animation in conjunction with an illustration package capable of superimposing a user's existing display objects. An animation in the media object may be implemented in various formats, such as Flash™, Microsoft Silverlight™, or the like. When displayed, the media object may have a transparent background. In other words, media objects of the networking system 300 may appear to float in front of other objects displayed on a client computer 102.

Media objects may comprise web-based objects selectable by the first user and sent to the second user after prompting by the first user. The first user may select a media object from a predetermined collection of media objects presented to the first user. The media objects may be associated with a theme, such as a particular holiday, feeling, or season. Media objects available for selection on the web site 310 may change or rotate based on various factors, such as season or political climate.

Media objects may be dynamic and customizable to further personalize interactions between the first user and the second user. For example, and not limitation, a username of the first user may be automatically inserted into a media object sent to the second user, or the networking system 300 may prompt the first user for text to insert into the media object. For further example, the media object may comprise a personalized note to the second user. After the first user selects an option to send the personalized note, the first user may be prompted to enter custom text to be displayed in the note. When the second user receives the note, an animation may play in the web client 124 of the second user. The animation may display, for example, a pen writing the text entered by the first user.

When a media object is selected for sending, the selected media object and any user customizations may be stored and queued on the server assembly 230. To efficiently utilize space on the server assembly 230, if a media object includes an animation, the media object may preferably comprise no more than approximately 30 seconds of animation at 30 frames per second. Additionally, the file size of a media object is preferably no more than approximately 150 kilobytes. Those of skill in the art will recognize that these exemplary animation characteristics and file size are provided as sample characteristics for use in an exemplary computer system. As computing technology improves, these characteristics may be broadened.

When the first user selects a media object to send to the second user, the chosen media object may be stored in a queue of the server assembly 230. In an exemplary embodiment, display of the packaged media object on the second user's client computer 102 may be purposely delayed until a predetermined event occurs. For example, such display may be delayed until the second user returns to a chat room in which the second user actively chats with the first user.

In an exemplary embodiment of the media interaction system 360, the media object may be delivered to the second user's client computer 102 through a pull method. The pull method may be implemented by creating a pulse, or heartbeat, that is repetitively fired by the web client 124, and may be received by the server assembly 230. The request may inform the server assembly 230 of a current state of the web client 124 and any events that should be handled. In return for each pulse sent by the web client 124, data is delivered to the web client 124 regarding how to handle such events.

The first user's request to send the media object may be transmitted to the server assembly 230 in this manner, and may create an event and accompanying metadata on the server assembly 230. The server assembly 230 may read the metadata to determine how to handle the event. Based on the metadata, the server assembly 230 may determine that the event is a media object and should be addressed to the second user's client computer 102. The server assembly 230 may then create an event and metadata for the second user's web client 124, and may retain the event and metadata in a queue until the server assembly 230 hears from the second user's web client 124. When the second user's web client 124 fires a pulse, the server assembly 230 may respond by transmitting the data in its queue, such as the event related to the media object, to the web client 124. The web client 124 may then receive the data in the queue, including the media object event. After the event is received, the second user's web client 124 may display the media object selected by the first user.

In an alternative exemplary embodiment, in which a communications channel is enabled between the second user's web client 124 and the server assembly 230, the media object may be delivered to the second user's client computer 102 via a push method. In that case, the server assembly 230 may remain aware of the web client 124 because of the open channel and, therefore, the web client 124 may remain available to respond to requests sent by the server assembly 230. The server assembly 230 may send the event and associated metadata directly to the second user's web client 124 without the web client 124 firing a pulse to determine whether it should receive the media object.

The networking system 300 may provide three categories of media objects, including packaged media objects, extended media objects, and bi-directional media objects.

A packaged media object may comprise a flash animation allowing little to no selectable customization by the first user. In other words, the packaged media object may be pre-packaged and sent as-is. The packaged media object may be an animation, such as a flash animation, which may include a catch phrase or punch line.

A packaged media object may be selected for delivery from various portions and web pages of the web site 310. Preferably, however, the first user may select and send a packaged media object from within a chat session with the second user. During the chat session, there may be a portion of the chat web page comprising a menu of sendable packaged media objects. The menu may represent each packaged media object as an icon, which may or may not be animated. For example, the web site 310 may provide a drop-down menu of selectable media objects. When the first user places a cursor over a menu item for a particular packaged media object, a pop-up may identify a name or description of the packaged media object.

When the first user clicks a list item representing a chosen packaged media object, the packaged media object may be delivered to the second user. In some embodiments of the networking system 300, before the packaged media object is sent, the first user may be asked to confirm that he wants to send the packaged media object. But this is not required. The networking system 300 may display the media object on the client computers 102 of both the first user and the second user. For example, if the media object comprises a flash animation, the flash animation may be played on each of the client computers 102.

Extended media objects may comprise interactable flash animations from the first user to the second user. For example, and not limitation, an extended media object may be a virtual gift, such as a locket containing an image selected by the first user. Alternatively, an extended media object may contain virtual food or a virtual beverage. In an exemplary embodiment of the networking system 300, the first user may select the extended media object from a virtual gift shop on the web site 310. The extended media object may then be displayed to the second user without affirmative prompting of the second user or, alternatively, the extended media object may be delivered to a virtual mail box or other virtual location of the second user. In the latter case, the second user may be required to retrieve the extended media object from its virtual location.

A difference between a packaged media object and an extended media object may be that, before a chosen extended media object is sent, the first user may be prompted to provide some degree of customization for the extended media object. For example, the first user may be asked to select a specific gift or beverage for the second user. As a result, unlike with a packaged media object, the first user may observe a different display of the media object than observed by the second user. For example, while the first user may view a virtual bar for selecting a drink to send the second user, the second user may view a prepared drink.

A bi-directional media object may allow, or require, interaction from both the first user and the second user. For example, and not limitation, the bi-directional media object may comprise a game for two or more players. The first user may initiate the bi-directional media object from, for example, a profile of the second user. Alternatively, the first user may choose to send a bi-directional media object and may then be prompted to select a recipient user, such as the second user, to receive the bi-directional media object. After the first user initiates the bi-directional media object, a prompt or invitation may be sent to the second user, requesting that the second user participate in the bi-directional media object.

During interaction within a bi-directional media object, the first user may dictate an action and may receive a response from the second user. This may occur iteratively in a bi-directional media object constituting an ongoing game. Selected action of the first and second users within a bi-directional media object may be stored in a shared object within a flash animation file.

Two or more users may participate in a bi-directional media object. When users, such as the first and second users, participate in a bi-directional media object, their web clients 124 may become statically linked through a dedicated server object providing a dedicated communications channel. This may provide an efficient delivery mechanism for the users.

The media object may be cached on the client computers 102 of the first and second users. In a first exemplary embodiment of the media interaction system 360, an HTTP protocol is provided for implementing a pull method for bi-directional media objects. The pull method may be similar to that described above for other media objects. With the bi-directional media object, however, the pulse from each involved web client 124 requests that the server assembly 230 act as a proxy, and that the data being transmitted from the web client 124 should be addressed to the dedicated server object associated with the bi-directional media object. In the pulse, the web client 124 may also request that the server assembly 230 transmit event data relating to the bi-directional media object, such as actions of other users participating in the bi-directional media object.

In another exemplary embodiment, when a communications channel is enabled between the web client 124 and the server assembly 230, a push method may be implemented similar to the push method described above. In that case, the web client 124 may have direct access to the dedicated server object, which may send events and metadata for the bi-directional media object directly to the involved web clients 124.

Because the bi-directional media object may require interaction from both the first and second users, it may be required that both users be logged into the web site 310 during use of the bi-directional media object.

When a bi-directional media object is complete, such as when a game has come to its conclusion, either of the users may choose to run the bi-directional media object again. In that case, the other user may receive a prompt requesting whether to replay the bi-directional media object. If the user and the second user agree to replay the bi-directional media object, the bi-directional media object may be restarted. Results of the bi-directional media object, such as who won a game in the bi-directional media object and statistics of the game, may be stored in a database on the server assembly 230 for future use.

Figure 13:
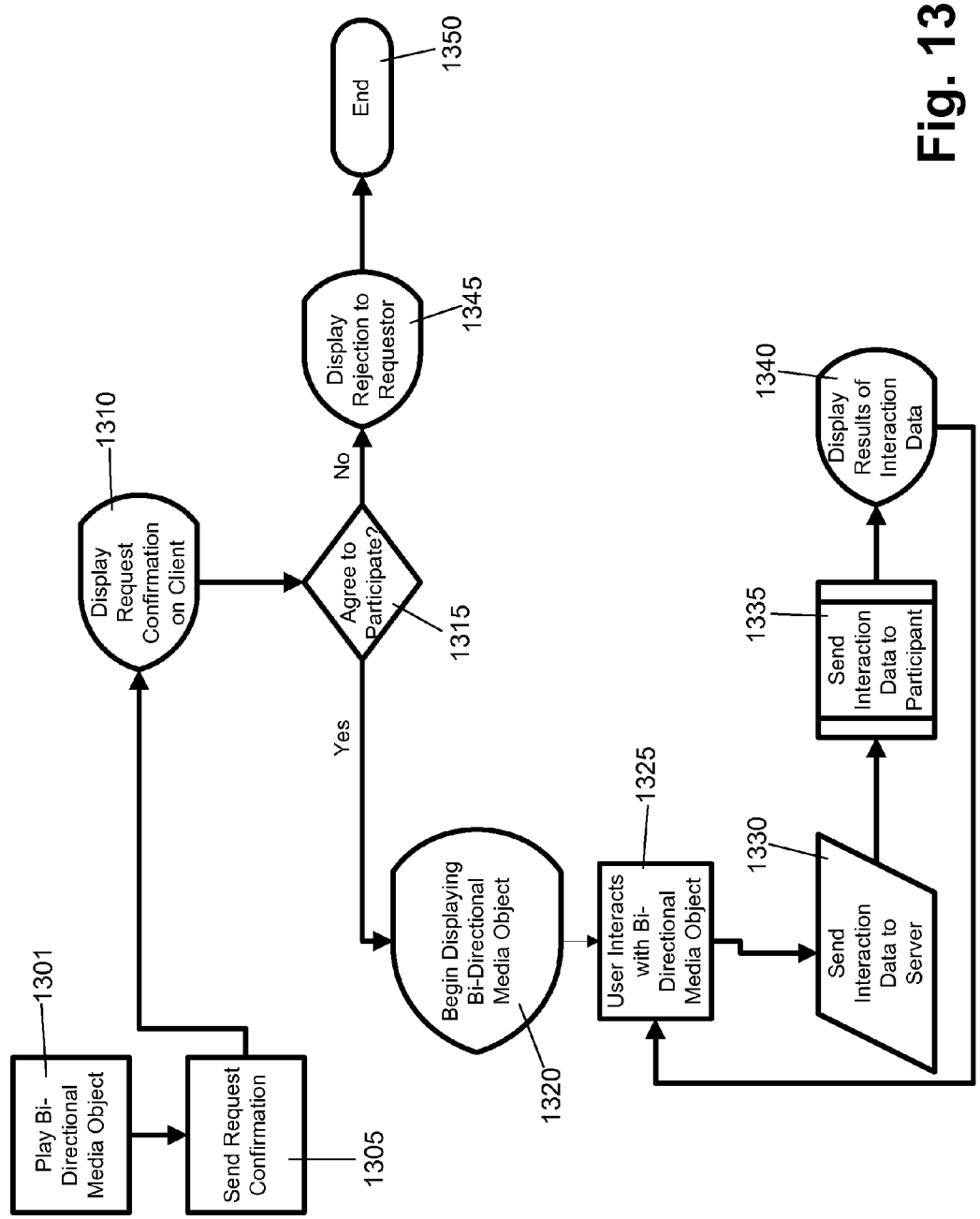
FIG. 13 illustrates a flow diagram of an operation of a media interaction system of the networking system, according to an exemplary embodiment of the present invention.

FIG. 13 illustrates a flow diagram of an operation 1300 of a bi-directional media object, according to an exemplary embodiment of the media interaction system 360. At 1301, a web client 124 may begin to play the bi-directional media object. At 1305 and 1310, the first user may send a request to the second user requesting participation in the bi-directional media object. At 1315, the second user may agree or refuse to participate. If the second user refuses, a rejection may be displayed to the first user at 1345, and the bi-directional media object may terminate at 1350. Otherwise, if the second user agrees to participate, the bi-directional media object may be displayed on the web clients 124 of both users at 1320. At 1325, a cycle may begin of the first and second users taking turns interacting with the bi-directional media object. In a first iteration of the cycle, the first user may interact with the bi-directional media object at 1325. Interaction data may be transmitted to the server assembly 230 at 1330, and may be transmitted to the second user at 1335. At 1340, the results of the first user's interaction may be displayed on the web clients 124 of the first and second users. Then, the cycle may repeat at 1325, with the second user interacting with the bi-directional media object.

Accordingly, the media interaction system 360 may enable users to interact with one another through multimedia content displayed on the web site 310.

Display System

The display system 370 of the web site 310 may provide a means to modify a look and feel of the web site 310 as presented to the user via the web client 124. Predetermined elements of the visual look and data content of the web site 310 may be user-adjustable. The data presented to the user can be customized by changing the colors and layout of website data element containers. Also, the website data presented can be filtered by the user's theme preference.

User configurations may be stored in a web cookie on the client computer 102, and in a database field unique to each individual user's profile. Web cookies provide a standard means for the web client 124 to maintain its state within a given internet domain. Accordingly, future visits to the web site 310 may not require the web client 124 to download data relating to the theme, color, or display defaults for the user. The web cookie may remain on the client computer 102 even after the web client 124 is closed. If the user logs into the web site 310 and the web client 124 is unable to find a web cookie on the client computer 102, the web client 124 may then retrieve default theme, color, and display value, and may create a web cookie for future use.

When the user logs onto the web site 310, an access token is generated for the user. A new access token may be generated each time a user is authenticated and logs into the web site 310. The access may be provided to the server assembly 230 when the web client 124 interacts with the server assembly 230. The access token may enable the server assembly 230 to uniquely identify the web client 124. The access token may have a limited lifespan and may be regenerated at each login. The access token may be stored in web cookies and in a cache object. While the user is logged into the web site 310, the user's configurations may be stored in the cache object in addition to being stored in the database.

If the user has not selected a preferred theme or color in their web site preferences, a default theme and color may be used. Default configurations may be based on certain data relating to the user. Such data determining the default configuration may include, without limitation, the user's member category (i.e., common or featured), gender, or specified purpose for using the web site 310. The web site manager 315 may modify available themes and color schemes periodically, or at any time. Users may be able to change a displayed color scheme with a single mouse click. This may be made possible by switching cascading style sheets ("CSS") and page graphics of the web site 310 through an object-oriented language and dynamic updates.

Page graphics and text may be altered for a variety of needs. Such alteration may be implemented by using compartmentalization, or a hierarchy, for art and text for presentation to the user via the web client 124. For example, distinct folders may be provided for site, theme, and sub-theme. Each folder may include, for example, a color and a language. Further, each color for site, theme, and sub-theme may include its own language folder.

By breaking the site into these compartments, a change of folder reference for each CSS, graphic, or text object may dynamically change colors, themes, and languages without requiring reloading of a web page on the web site 310. This implementation may also simplify development of the web site 310, as background code need not define themes, sub-themes, languages, or colors. New themes, colors, languages, and various other configuration details may be provided without any additional code.

When the user changes his or her color preference, the change is stored in the current session's cache object and in the user's local web cookie. The user's login session on the web site 310 may expire from the cache object after the web site 310 is unloaded from the web client 124. Removal of the cache object on the server assembly 230 may occur by various means. In an exemplary embodiment of the display system 370, the web client 124 may send a log-off request to the server assembly 230. In the event this signal is not received, the server assembly 230 may recognize that the web client's pulse has terminated. Then, the server assembly 230 may retain the cache object for a predetermined duration, or until occurrence of a predetermined event, before removing the cache object. Retaining the cache object for a predetermined duration, or until occurrence of a predetermined event, may ensure that the server assembly 230 does not prematurely remove the cache object.

At a color change request, various tasks may be performed to effect a new color scheme. The user's cache object may modify a stored color value. The user's web site cookie may be altered with the new color value. The user's web site preferences database field may be updated with the new color value. The CSS provided for web site 310 rendering may change to a CSS specific to the new color value. Additionally, the web site 310 may be re-rendered using the new web site preference color.

As described above, color changes may be implemented through folder compartmentalization. Folders may be provided for each color option of the web site 310. Accordingly, the web client 124 may dynamically alter a color of the web site 310 without requiring a re-login or reloading of a web page of the web site 310.

Themes may be provided to allow the user to further customize the web site 310. A theme may define graphic images and data content presented to the user. In addition to being stored in the user's database field, the chosen theme may also be stored in the cache object when the user is logged into the web site 310.

When the user selects an available theme, a dynamic update may instruct the application code to display an appropriate set of data and graphics applicable to the theme. The theme choice may be implemented through an object-oriented programming language, and may be processed on the pre-render of page elements.

Photo Management System

As mentioned above, the networking system 300 may further include a photo management system 380. The photo management system 380 may enable viewing, organizing, and editing images associated with a user account. Such images may include, but are not limited to, photographs and graphical representations of objects.

With the photo management system 380, a user may have an image library on the web site 310, and may utilize an image editor on the web site 310 to modify images in the image library. A user may be able to view photo libraries, or predetermined portions of photo libraries, of other users. The user may upload images to the library, and may also create and modify images in the library. From the image library, the user may sort images and arrange images in folders for more efficient organization.

The photo management system 380 may include a gallery for viewing images in the image library. In the gallery, the user may scroll through all images, or a set of images, in the image library.

To enable uploading of images, a photo upload dialog may be provided on a web page of the photo management system 380. Through the photo upload dialog, the user may browse images on, or linked to, the client computer 102 and may choose one or more of such photos to add to the image library. A browser of the photo upload dialog may enable users to view thumbnails of images on the client computer 102. This may enable the user to more efficiently select images that the user intends to add to the image library.

Uploaded or newly created images in the image library may not be immediately viewable by other users. When uploaded or created, a new image may have an unapproved status. While approved images may be viewable by others, unapproved images may not be viewable by other users. For an image status to change from unapproved to approved, the web site manager 315 may be required to approve the image. Additionally, an image may not be viewable if it has not been selected as a viewable image by the user of the image.

The photo management system 380 may require that no more than a predetermined number of images from the user's image library be appointed for each purpose that can be given to images. For example, and not limitation, the user may be required to select no more than a predetermined number of images viewable by other users, or no more than a predetermined number of images viewable by those other users categorized as "friends" of the user. The user may appoint an image to a certain purpose by dragging the image into a designated section of a web page of the photo management system 380.

Figure 14:
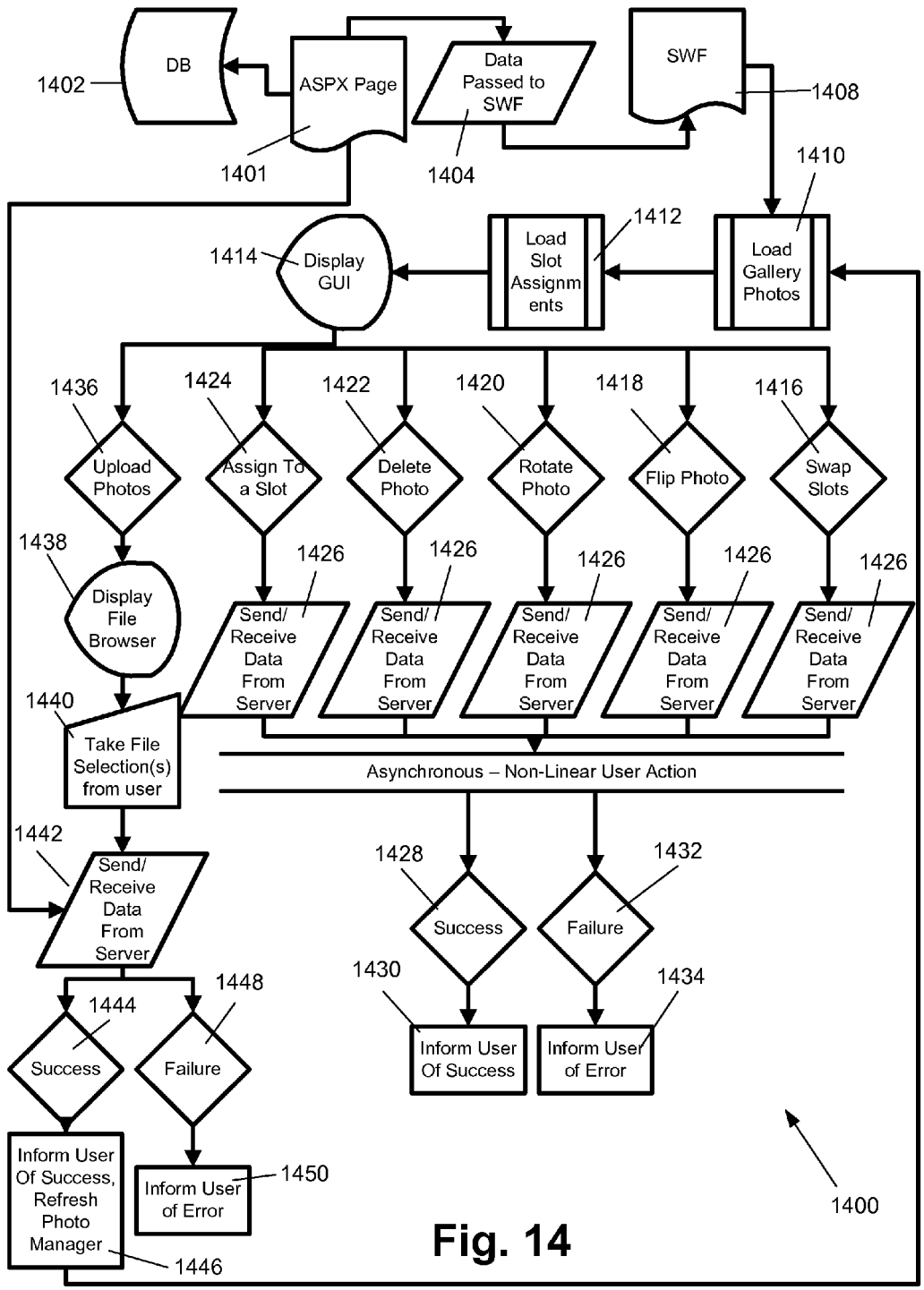
FIG. 14 illustrates a flow diagram of an operation of a photo management system of the networking system, according to an exemplary embodiment of the present invention.

FIG. 14 illustrates a flow diagram of a process 1400 of managing and editing images in an exemplary photo management system 380. At 1401 and 1402, the web client 124 may communicate with a database on the server assembly 230. At 1404 and 1408, the web client 124 may receive image data from the database. The web client 124 may then load images from the image library at 1410. At 1412, the web client 124 may assign the images according to their appointments, such as assigning a position of an image in a certain location based on whether the image represents part of the user's viewable profile, or whether the image is viewable only to friends. The web client 124 may display a graphical user interface to the user at 1414.

The user may then have an ability to perform actions regarding the images, as described above. At 1416, the user may modify appointments of various images. At 1418, the user may flip an image. At 1420, the user may rotate an image. At 1422, the user may delete an image from the image library. At 1424, the user may assign an image to a particular appointment. After the user selects any one of the above actions, data may be communicated between the client computer 102 and the server assembly 230 to accomplish the selected task, and to store the user's modifications to images on the database of the server assembly 230. If the selected action was successful at 1428, the web site 310 may notify the user of the success at 1430. Alternatively, if the action failed at 1432, the user may be notified of the failure at 1434.

The user may upload images to the image library at 1436. In an exemplary embodiment of the photo management system 380, a file browser may be displayed at 1438 to assist the user in selecting a file to be uploaded. At 1440, the selected file may be prepared for uploading, and at 1442, image data from the selected file may be transmitted from the client computer 102 to the server assembly 230. If this operation is successful at 1444, a confirmation may be displayed to the user at 1446. Also at 1446, the web client 124 may refresh a web page of the image library to display the image library containing an image from the selected file. The process 1400 may then, once again, load images in the image library at 1410. Alternatively, if the operation of uploading the selected image file fails at 1148, an error message may be displayed to the user at 1450.

The image editor of the photo management system 380 may enable the user to modify images in the image library. The image editor may include tools to crop an image, rotate an image, flip an image, delete an image, create a photo profile, and various other image-editing tools.

Additionally, the photo editor may provide a tool enabling the user to create a thumbnail image, which may represent the user on the web site 310. The user may associate the thumbnail image with text, which may be used in conjunction with the thumbnail to represent the user on the web site 310. Preferably, the user may have only a single thumbnail image, so creating a new thumbnail may automatically delete any old thumbnail.

The thumbnail tool may enable the user to crop an image to a specified size or to specified dimensions or aspect ratio. To use the thumbnail photo, the user may first select an image from the image library. The user may select a first point on the selected image, and may do so by clicking with a mouse button, with a cursor over the first point, and holding the mouse button down. The user may then select a second point on the selected image. Selecting the second point may entail dragging the cursor to the second point while holding the mouse button down, and then releasing the mouse button with the cursor over the second point. As the first user drags the cursor between the first and second points, a rectangle may be displayed between the first and second point, such that the first and second points lie on opposite corners of the rectangle. If valid, a portion of the selected image lying inside the rectangle may represent a new thumbnail created by the user. The selected portion may be deemed invalid, however, if, for example, the rectangle extends outside the bounds of the image. If the selected portion is invalid, a new thumbnail may not be created for the user.

Figure 15:
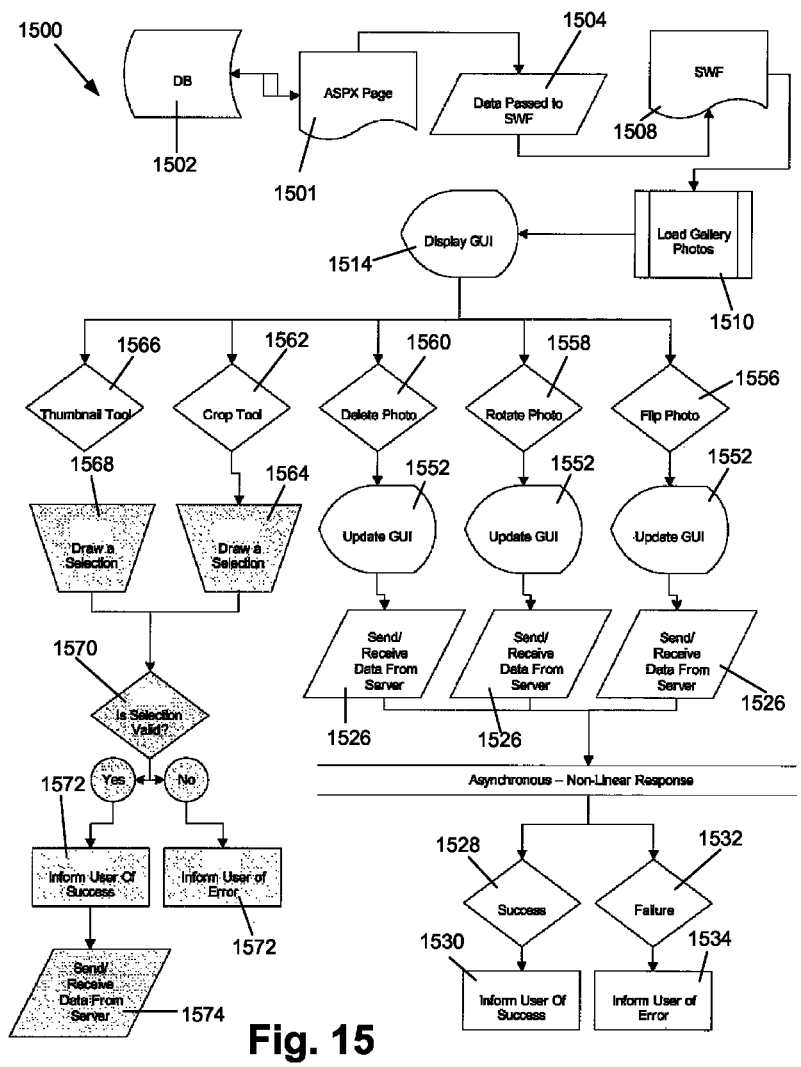
FIG. 15 illustrates a flow diagram of an operation of a photo editor of the photo management system of the networking system, according to an exemplary embodiment of the present invention.

FIG. 15 illustrates a process 1500 of editing images with an exemplary image editor of the photo management system 380. After the networking system 300 displays the graphical user interface at 1414 (as described in FIG. 14), the user may edit images as described above. For example, the user may perform any of the following: flip an image at 1556, rotate an image at 1558, delete an image at 1560, and create a thumbnail at 1566. At 1526, data regarding the user's image modifications may be communicated between the client computer 102 and the server assembly 230. If the modifications fail at 1532, the user may be informed of the failure at 1534. On the other hand, if the modifications succeed at 1528, the user may be informed of the success at 1530.

At 1562, the user may attempt to crop an image. At 1564 and 1568, the user may select a portion of the image as described above, with respect to creating a thumbnail. At 1590, the networking system 300 may determine whether the selected portion of the image is valid. At 1572, the user may be informed of success or failure of cropping the image based on the user's selection. If the cropping was successful, data may be sent to the server assembly 230 to store the user's modifications to the image at 1574.

Figure 16:
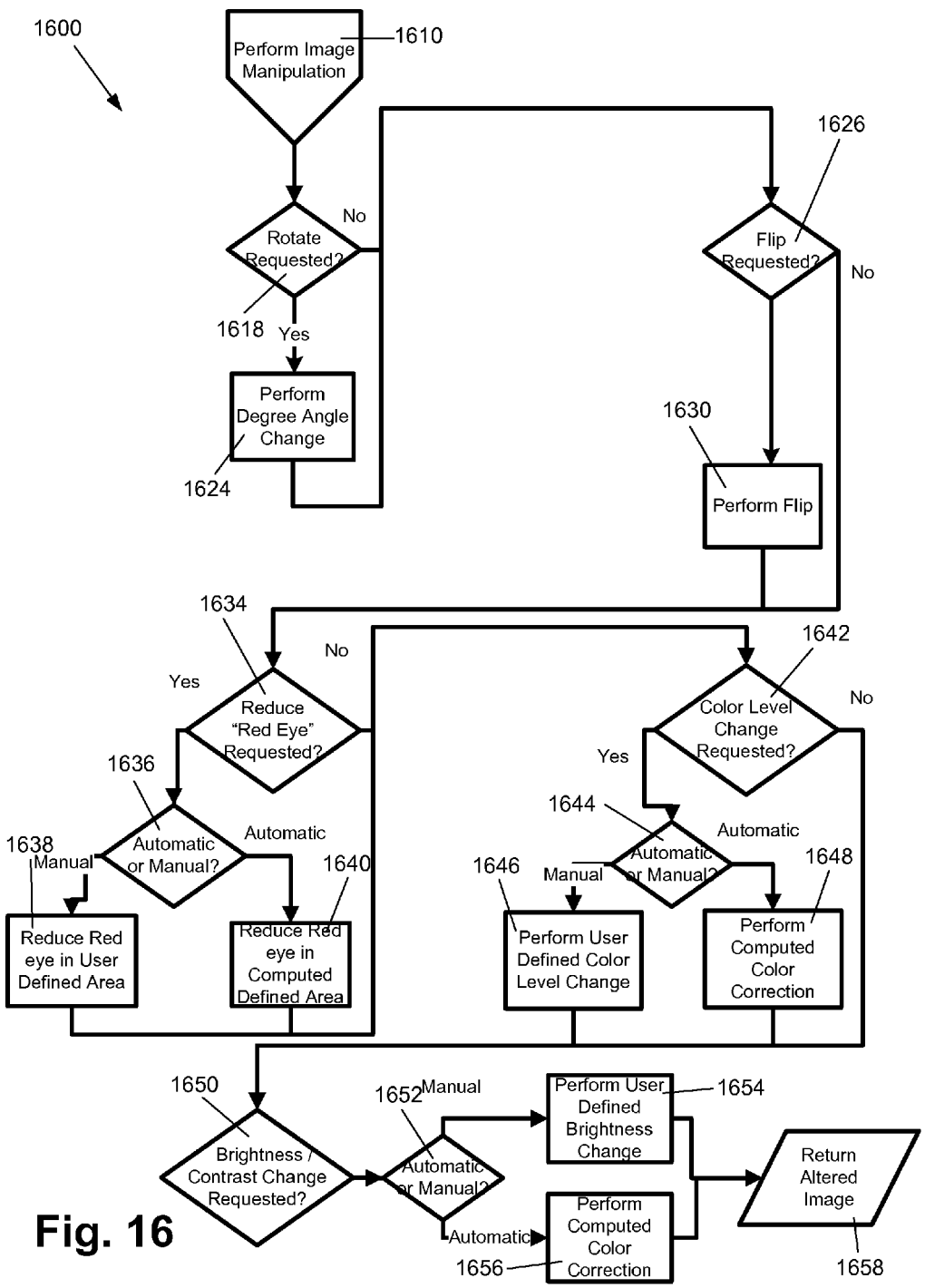
FIG. 16 illustrates a flow diagram of an implementation of the photo editor of the photo management system, according to an exemplary embodiment of the present invention.

The networking system 300 may store both an original raw image and a set of attributes representing modification to the image. The modifications may be a result of photo editing on the part of the user. The attributes may contain all data required to reconstitute the current image having the user's previous modifications. Accordingly, when an image is to be displayed on the client computer 102, the raw image may be manipulated with the stored attributes before being delivered to the client computer 102. FIG. 16 illustrates a flow diagram of an exemplary process 1600 of delivering images to the client computer 102 in the photo management system 380.

As shown in FIG. 16, at 1618, the networking system 300 determines whether the user has requested a rotation of the image. Such determination may occur by examining the stored attributes associated with the image. If a rotation is requested, at 1624, the desired rotation is performed. At 1626, the networking system 300 may determine whether the image should be flipped. At 1634, the networking system 300 may determine whether to perform red-eye reduction and, at 1636, whether such red-eye reduction is to be performed manually or automatically. The networking system 300 may then use the attributes to re-perform the red-eye reduction as originally performed. If a manual red-eye reduction was performed, characteristics of such reduction may be retrievable from the stored attributes.

At 1642, the networking system 300 may determine whether color levels should be modified. If so, at 1644, the networking system 300 may determine whether the user desired manual or automatic modification of color levels. At 1650, the networking system 300 may determine whether to modify brightness and contrast of the image and, at 1652, whether such modifications are manual or automatic. At 1654 and 1656, the networking system 300 may perform the requested modifications. Finally, at 1658 the resulting image is returned.

The image may be at least partially defined by image manipulation arguments, which may reflect the user's modifications to the image. The server assembly 230 may store each image as well as one or more sets of image manipulation arguments. The image manipulation arguments may be stored in a table or array along with a reference to the associated image. Each set of manipulation arguments for the image may define a displayable image created through a set of user manipulations to the original image. For example, a user may create a thumbnail from the original image to identify the user on the web site 310. The user may also rotate and crop the original image for display in the user's profile. Depending on whether the web site 310 is displaying the thumbnail version of the image or the profile version of the image, the networking system may apply a different set of manipulation arguments to the image when displaying the image on the web site 310.

Preferably, the image manipulation arguments define modifications to the image in a coordinate system of the image. For example, if the user rotates and then crops the image, both operations may be stored in a set of image manipulation arguments with reference to coordinates relative to one or more points on the image. This enables appearance of the image to be independent of an order in which the rotation and cropping are applied to the image before the image is displayed. If, in contrast, operations are stored with reference to an absolute coordinate system, then reconstituting the modified image would require performing the operations in the order in which the user originally performed such operations. The present photo management system 380 may allow more flexibility by enabling operations within a set of manipulation arguments to be stored in various orders.

A second set of arguments, display arguments, associated with an image may be provided to define how the web client 124 may manipulate formatting and display of the image. For example, although the image may be stored in a size of 800×600 pixels, the web client 124 may display the image into a 320×200 display area. Accordingly, display arguments may instruct the web client 124 to shrink the image to fit in a 320×200 display area.

Figure 17:
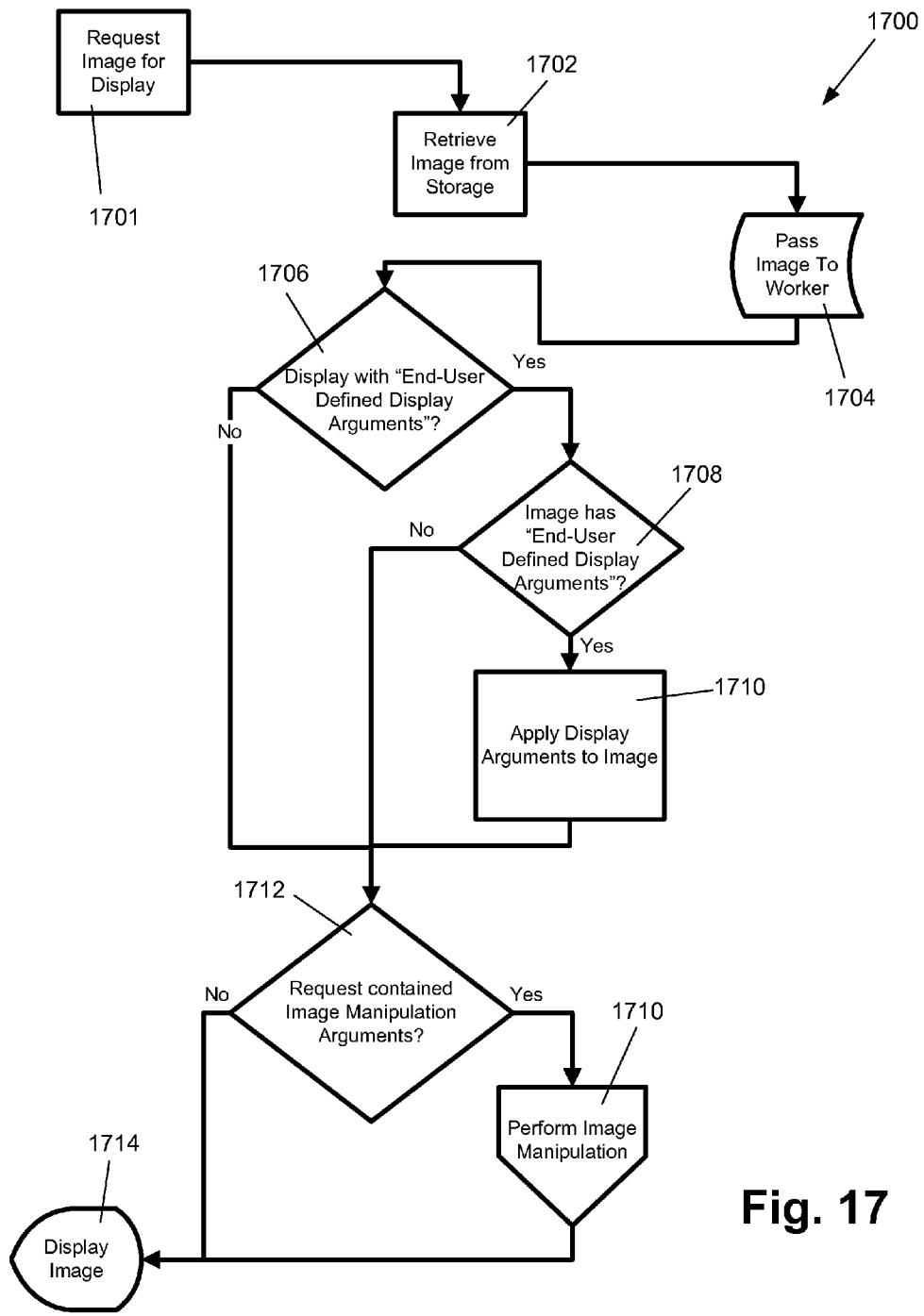
FIG. 17 illustrates a flow diagram of a process of displaying an image in the photo management system of the networking system, according to an exemplary embodiment of the present invention.

FIG. 17 illustrates a flow diagram of a process 1700 of displaying an image in the photo management system 380. At 1701, the user may request that an image be displayed. Accordingly, the networking system 300 may retrieve the image from storage on the server assembly 230 at 1702 and 1704. At 1706, the networking system 300 may determine whether there are any display arguments for the image. At 1708, the networking system 300 may determine that display arguments should be applied to the image, and such arguments are applied at 1710. After the display arguments have been applied, or after the networking system 300 determines that display arguments need not be applied, at 1712, the networking system 300 may determine whether the user requested any user manipulation arguments for the image. If user manipulation arguments exist for the image, the networking system 300 may manipulate the image according to the user manipulation arguments beginning at 1610 (FIG. 16). Finally, at 1714, the image may be displayed to the user.

Image caching may be provided in the photo management system 380 of the networking system 300. Caching may result in efficient image loading, while maintaining conventional benefits of retaining stored images on the database, such as reliable long-term storage. When a web client 124 requests an image from the networking system 300, the image may be modified by parameters of the stored attributes before the image is delivered to the web client 124 at the client computer 102. Images are modified by the processing server using a series of parameters provided when a request is made. After all modifications are complete, the images may be saved to a cache server, which may comprise a storage device associated with a server in the server assembly 230. Use of the cache server to store the modified image may reduce or eliminate the need for the server assembly 230 to repetitively process the image before displaying it. Data in the cache server may be disposable and, accordingly, may be removed from the cache server when the user logs out or when space is needed. The storage device may be implemented in a Redundant Array of Inexpensive Disks ("RAID") array to enhance speed, capacity, and performance of the storage device.

Image caching may relieve the server assembly 230 of potentially extensive processing of the image, by writing the image to the storage device after the image has been modified according to its associated stored attributes. If the image is requested again, the networking system 300 may retrieve a cached copy of the image from the storage device instead of from a database on the server assembly 230.

A benefit of image caching is stateless replication, which enables new servers to be added to the server assembly 230 without replicating an existing cache. Conventionally, each server would be required to replicate caches of other servers, and to synchronize its cache with other servers. This utilizes time and bandwidth. In exemplary embodiments of the photo management system 380, however, the new server would not be required to synchronize cached images with other servers of the server assembly 230. For example, if a requested image does not exist on a storage device of the new server, the image may be retrieved from the database, modified, and Messaging System As mentioned above, the networking system 300 may further comprise a messaging system 390. The messaging system 390 may enable a first user to leave a message for a second user of the networking system 300. For example, the messaging system 390 may enable a common user 415 to leave a message for a featured user 435, such that the featured user 435 may view and respond to the message at the convenience of the featured user 435. A featured user 435 may also leave a message for a common user 415. Additionally, a common user 415 may leave a message for another common user 415, and a featured user 435 may leave a message for another features user 435.

Figure 18:
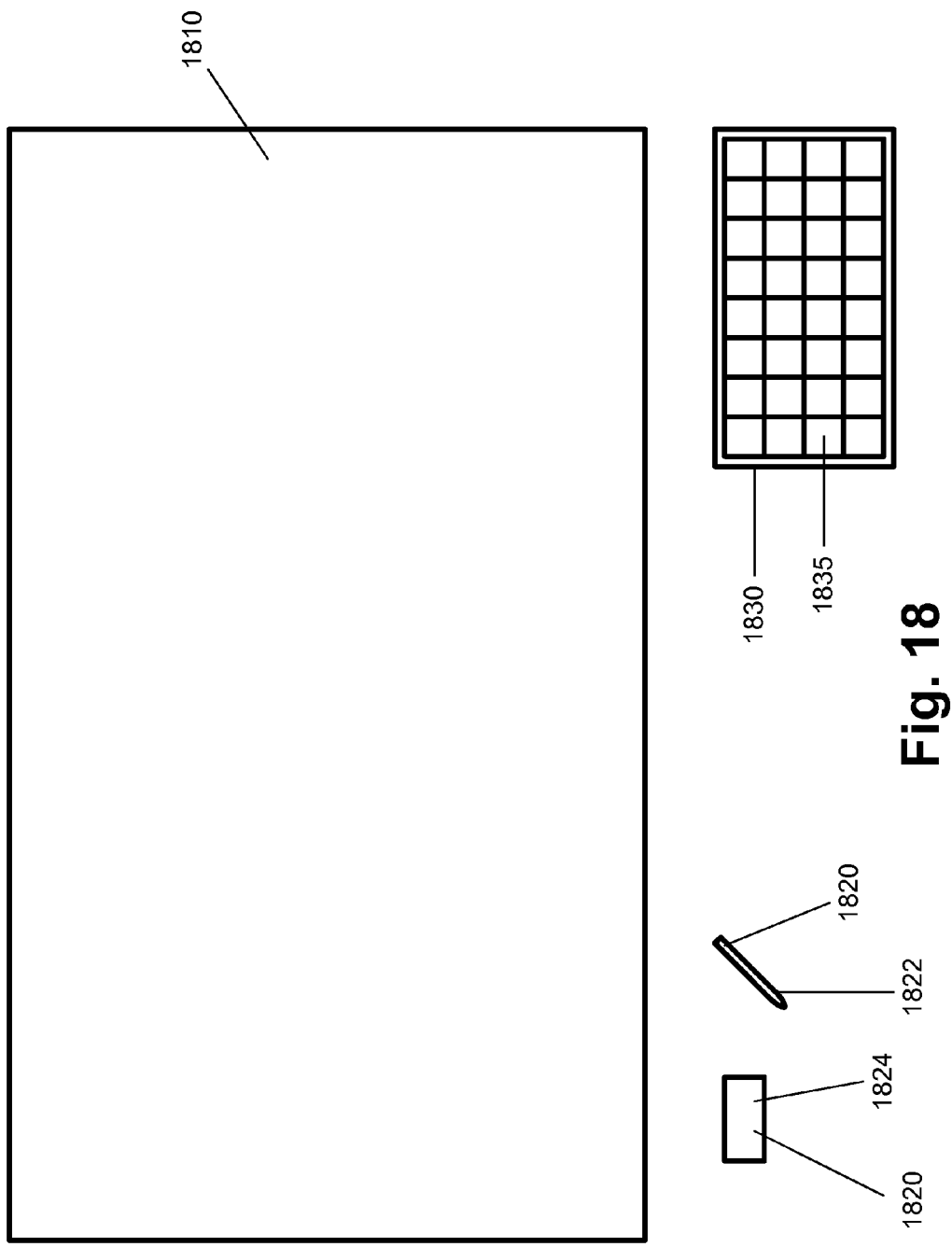
FIG. 18 illustrates a web page of a messaging system of the networking system, according to an exemplary embodiment of the present invention.

FIG. 18 illustrates an exemplary web page of the messaging system 390. As shown in FIG. 18, the messaging system 390 may comprise a message area 1810, at least one graphical tool 1820, and a color selector 1830.

The message area 1810 may provide a background for the message. In some exemplary embodiments of the messaging system 390, the message area 1810 may look similar to a whiteboard, blackboard, piece of paper, computer monitor, or various other objects on which one might conventionally leave a message or receive a message. The look and feel of the message area 1810 may be customizable. For example, and not limitation, the first user may change an appearance of the background provided by the message area 1810 by clicking a button labeled "Background" on the web page.

In an exemplary embodiment of the messaging system 390, the message area 1810 of a particular user may retain text and images left by previous users of the same message area 1810. Accordingly, when the first user views the web page displaying the second user's message area 1810, the first user may see messages previously left by the first user and by other users.

The graphical tools 1820 may comprise one or more representations of implements for creating the message. For example, a stylus 1822 and an eraser 1824 may be provided as graphical tools 1820. Other graphical tools 1820 provided may include, without limitation, a text tool, a brush tool, a spray paint tool, a straight line tool, a rectangle tool, and a circle tool. When activated, the stylus 1822 may add portions of a message to the message area 1810, while the eraser 1824 may remove portions of a message from the message area 1810.

Characteristics of the graphical tools 1820 may be customizable. For example, a size and shape of a graphical tool 1820 may be customizable, which may result in a customizable size and shape of modifications resulting from use of the graphical tool 1820. For example, increasing the size of the stylus 1822 may increase a width of a line drawn in the message area 1810 with the stylus 1822. Additionally, transparency of a graphical tool 1820 may be customizable, such that a resulting modification to the message area 1810 may become more or less opaque. Customizations may affect a single graphical tool 1820 or, alternatively, all graphical tools 1820, depending on either user preference or a specific embodiment of the messaging system 390.

The color selector 1830 may present the first user with two or more color blocks 1835 containing colors applicable to one or more graphical tools 1820. Each color block 1835 may be a predetermined color. When the first user selects a color block 1835, the color of the color block 1835 may be applied to the graphical tool 1820 next utilized in the message area 1810. A default color may be provided if the first user does not select a color block 1835. For example, a black color may be applied to graphical tools 1820 when the first user does not select a color block 1835.

Additionally, the color selector 1830 may allow the first user to adjust characteristics of a color, such as hue and saturation, and thereby create a custom color for application to a graphical tool 1820.

A message of the messaging system 390 may be created by manipulating a graphical tool 1820 on or in proximity to the message area 1810. The first user may select a graphical tool 1820 and, optionally, a color. When the first user activates the graphical tool 1820, such as by clicking a mouse button, the graphical tool 1820 may be applied to the message area 1810, thereby modifying a visual appearance of the message area 1810. For example, when the stylus 1822 is activated, moving the stylus 1822 across the message area 1810 may result in a line being drawn along a path of the stylus 1822 in the message area 1810. For further example, when the eraser 1824 moves across the message area 1810, text and images in a path of the eraser 1824 may be removed from the message area 1810. The modified visual appearance of the message area 1810 represents a viewable message. The message may comprise various combinations of text and images in the message area 1810, and may or may not be intended to portray a specific idea to a recipient of the message.

During message creation, the first user may be able to save the message. This may be enabled, for example, through use of a web page button or link labeled "Save."

Further, the first user may be able to undo a previous action. This may be enabled, for example, through use of a button or link labeled "Undo." In some exemplary embodiments of the messaging system 390, an action may not be undone if the action preceded a saving of the message, as described above.

Figure 19:
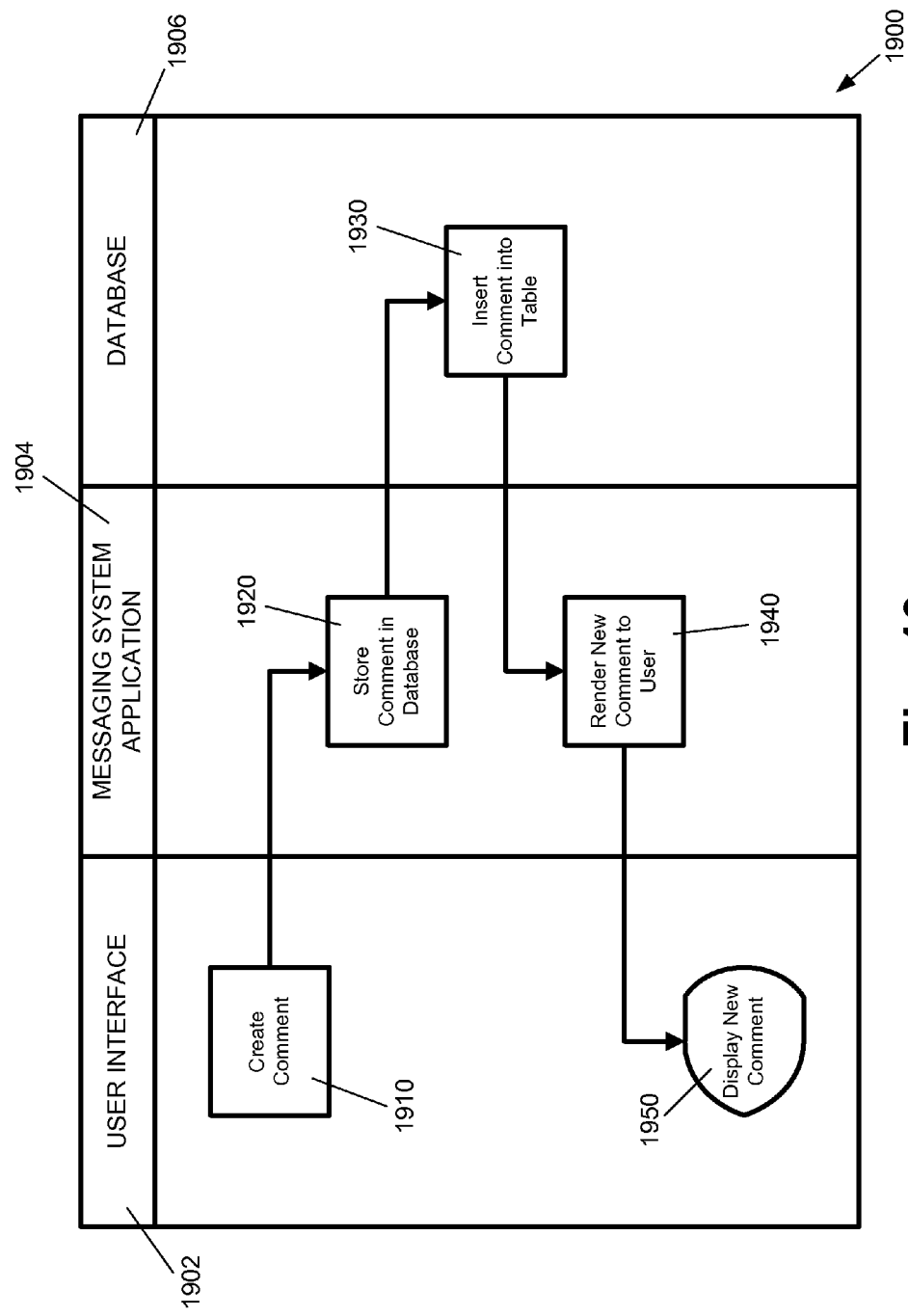
FIG. 19 illustrates a flow diagram of an operation of leaving a message through a messaging system of the networking system, according to an exemplary embodiment of the present invention.

FIG. 19 illustrates a flow diagram of an exemplary process 1900 of leaving a message, such as a text comment, through the messaging system 390. As shown in FIG. 19, three layers of operation may be implemented in the messaging system 390. These operational layers may include a user interface layer 1902, an application layer 1904, and a database layer 1906. Steps of the process 1900 occurring in the user interface layer 1902 may describe an interaction of the messaging system 390 with the user. Steps of the process 1900 occurring in the application layer 1904 may represent operations that occur in the client computer 102. Finally, steps in the database layer 1906 may occur in a database on the server assembly 230.

At 1910, the first user may enter a text comment for the second user. This may occur through use of the stylus 1822. After such text is produced, the text is stored as a record in a database on the server assembly 230 at 1920. Accordingly, at 1930, the text may be retained in a table of the database and properly associated with a message area 1810 of the second user. At 1940, the new text comment may be rendered. Rendering may generally take place behind the scenes of the web page, and a rendered image may not be viewable until displayed on the web page. At 1950, the new text comment may be displayed in the message area 1810, which may occur by making viewable a rendered image of the text comment.

Figure 20:
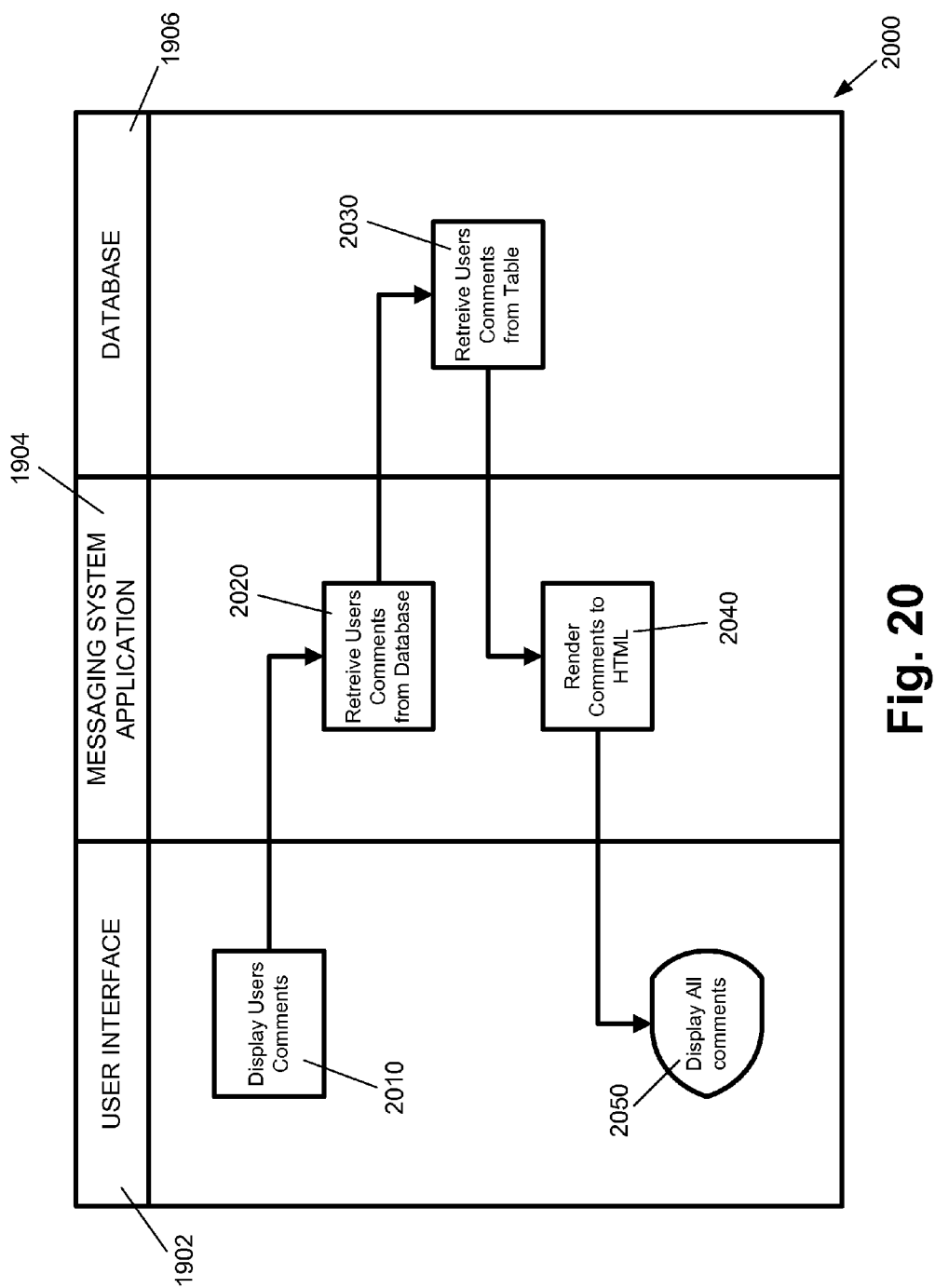
FIG. 20 illustrates a flow diagram of an operation of retrieving messages from the messaging system of the networking system, according to an exemplary embodiment of the present invention.

FIG. 20 illustrates a flow diagram of an exemplary operation 2000 of retrieving a message, such as a text comment, from the messaging system 390. As in FIG. 19, three layers of operation 1902, 1904, and 1906 may be utilized in retrieving a message. At 2010, the first user may request that a text comment be displayed. Such a request may be implied when the first user navigates to a web page displaying the message area 1810. The request may be transmitted through the messaging system application, at 2020, to the database. At 2030, the text comment may be retrieved from the database. The messaging system 390 may then render the text comment, preferably in HTML format, at 2040. Finally, at 2050, the text comment may be displayed to the first user.

Figure 21:
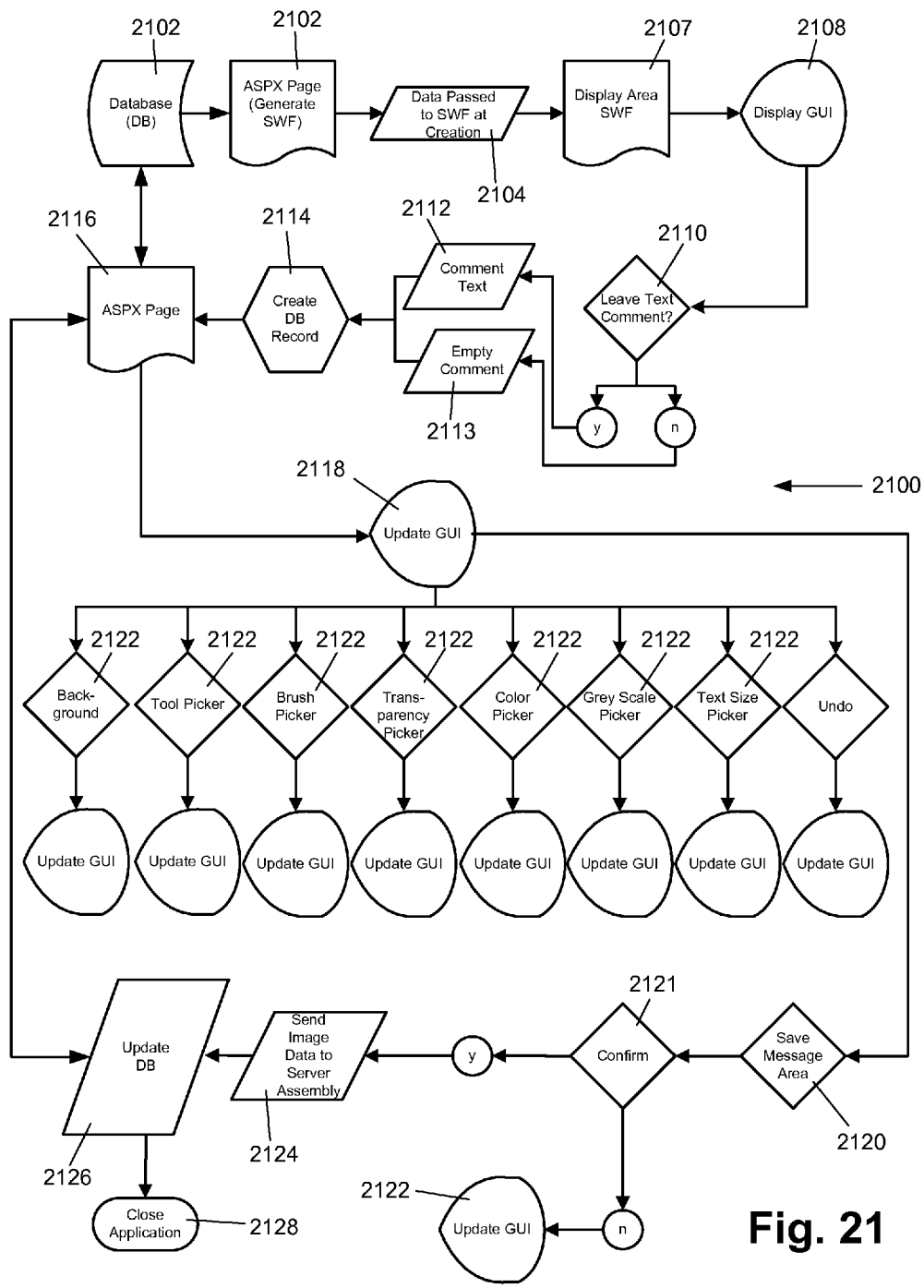
FIG. 21 illustrates a flow diagram of a general operation of the messaging system of the networking system, according to an exemplary embodiment of the present invention.

FIG. 21 illustrates a flow diagram of an exemplary general operation 2100 of the messaging system 390. At 2101 and 2102, the web client 124 may communicate with a database on the server assembly 230 regarding message data. At 2104 and 2107, the web client 124 may receive message data from the database. The web client 124 may then display the graphical user interface ("GUI"), including the message area 1810, via the web client 124 to display messages to a user. At 2110, the messaging system 390 may determine whether the user is attempting to leave a comment in the message area 1810. If so, the user's comment is accepted at 2112. Otherwise, an empty comment is accepted at 2113.

At 2114, a record may be created in the database for storing the comment. At 2116 and 2126, the web client 124 and the server assembly 230 may communicate with each other. The web client 124 informs the server assembly 230 of modifications to the message area 1810, so that the database on the server assembly 230 may be updated. The server assembly 230 may then send a confirmation to the web client 124. At 2118, the GUI may be update to display the new comment to the user.

Operations similar to those of the image editor of the photo management system 380 may also be integrated into the messaging system 390. For example, and not limitation, at 2122, the user may select a tool to modify the GUI. Specifically, the user may modify the message area 1810 by leaving a message. After a modification, the GUI may be updated to display the modifications to the user.

If the user indicates that he would like to save his modifications to the message area 1810, the messaging system 390 may receive a command to the save at 2120. The web site 310 may prompt the user for confirmation at 2121. If the user confirms his desire to save, an image of the message area 1810 may be sent to the server assembly 230 at 2124. At 2126, the database on the server assembly 230 may be updated with the user's modifications. Hence, the user may leave a message in the message area 1810, and may save his message for later viewing. After the database is updated, the message application 1904 may close at 2128.

Accordingly, through implementation of the crediting system 320, the chat bidding system 330, the performance bidding system 340, the telephony switching system 350, the media interaction system 360, the display system 370, the photo management system 380, and the messaging system 390, the networking system 300 may enable interaction between users.

While the networking system 300 has been disclosed in exemplary forms, it will be apparent to those skilled in the art that many modifications, additions, and deletions may be made without departing from the spirit and scope of the system, method, and their equivalents, as set forth in the following claims.

What is claimed is:

1. A method for connecting a communication session comprising:
    receiving, from a first user, communication acceptance criteria for communications based on a personal identification number (PIN) that is associated with the first user, the communication acceptance criteria comprising a list of accepted users who are members of a predefined class of users, the PIN configured to expire after a predetermined number of uses;
    receiving a request from a second user to initiate a communication session with the first user based on the PIN associated with first user;
    determining, based on the communication acceptance criteria, whether a communication session initiated by the second user based on the PIN is permitted between the first user and the second user, wherein the determining includes determining whether the PIN has expired; and
    responsive to determining the communication session is permitted, (i) initiating the communication session between the first user and the second user by requesting a first communication link to a first communication device associated with the first user and requesting a second communication link to a second communication device associated with the second user and (ii) reducing a number of remaining uses associated with the PIN, wherein, when the request for the first communication link is denied, the second user receives an alternative voicemail greeting, the alternative voicemail greeting being different from a primary voicemail greeting that would play when the first communication device is contacted directly.

2. The method of claim 1, wherein the communication session is a telephone call.

3. The method of claim 1, wherein the second user does not have access to a telephone number associated with the first user.

4. The method of claim 1, wherein the communication session is a computer-implemented audio call.

5. The method of claim 1, wherein the communication session is a computer-implemented video call.

6. The method of claim 1, wherein the second user does not have access to contact information associated with the first user.

7. The method of claim 1, wherein the communication acceptance criteria comprise a time range when telephone calls are acceptable.

8. The method of claim 1, wherein the communication acceptance criteria further comprise a list of unaccepted users.

9. The method of claim 1, wherein the communication acceptance criteria specify one or more acceptable subject matters.

10. The method of claim 1, wherein the communication acceptance criteria further comprise a schedule defining when a communication session with the second user should be accepted.

11. The method of claim 1, wherein the communication acceptance criteria define who may leave a voicemail message.

12. The method of claim 1, wherein requesting the first communication link to the first communication device comprises placing a telephone call to the first communication device.

13. The method of claim 1, further comprising connecting the first communication device to the second communication device if both the first communication device and the second communication device are activated.

14. The method of claim 1, further comprising:
    connecting the first communication device to the second communication device if the request for the first communication link and the request for the second communication link are both accepted.

15. The method of claim 1, wherein the request from a second user to initiate the communication session with the first user is received via a network connection.

16. The method of claim 1, wherein the request from a second user to initiate the communication session with the first user is received via a telephone call from the second user to a service center.

17. The method of claim 16, further comprising prompting the second user to enter the PIN associated with the first user.

18. The method of claim 1, further comprising sending caller identification data to the first user, wherein the caller identification data comprises an alias of the second user.

19. The method of claim 1, wherein the request from the second user to initiate a communication session with the first user includes a unique identifier associated with the second user.

20. A method comprising:
    receiving, from a first user, communication acceptance criteria for communications based on a personal identification number (PIN) that is associated with the first user, the communication acceptance criteria comprising a list of accepted users who are members of a predefined class of users, the PIN configured to expire after a predetermined date;

receiving a request, from a second user, to initiate a communication session with the first user based on the PIN associated with the first user;

determining, based on the communication acceptance criteria, whether a communication session initiated by the second user based on the PIN is permitted between the first user and the second user, wherein the determining includes determining whether the PIN has expired; and responsive to determining the communication session is permitted, initiating the communication session between the first user and the second user by requesting a first communication link to a first communication device associated with the first user and requesting a second communication link to a second communication device associated with the second user, wherein, when the request for the first communication link is denied, the second user receives an alternative voicemail greeting, the alternative voicemail greeting being different from a primary voicemail greeting that would play when the first communication device is contacted directly.

21. A method comprising: receiving, from a first user, communication acceptance criteria for communications based on a temporary personal identification number (PIN) that is associated with the first user, the communication acceptance criteria comprising a list of accepted users who are members of a predefined class of users;

receiving a request, from a second user, to initiate an anonymous telephone call with the first user based on the PIN associated with the first user, the request including the PIN and an identifier associated with the second user, but not including a telephone number associated with the first user;

determining, based on the communication acceptance criteria, whether a communication session initiated by the second user based on the PIN is permitted between the first user and the second user, wherein the determining includes vetting the identifier associated with the second user; and responsive to determining the communication session is permitted, initiating, without revealing the telephone number associated with the first user to the second user, the telephone call between the first user and the second user by requesting a first communication link to a first communication device associated with the first user and requesting a second communication link to a second communication device associated with the second user, wherein, when the request for the first communication link is denied, the second user receives an alternative voicemail greeting, the alternative voicemail greeting being different from a primary voicemail greeting that would play when the first communication device is contacted directly.

* * * * *